United States Patent
Ohara et al.

(10) Patent No.: US 10,270,127 B2
(45) Date of Patent: Apr. 23, 2019

(54) NONAQUEOUS ELECTROLYTE SECONDARY BATTERY

(71) Applicant: Nissan Motor Co., Ltd., Yokohama-shi, Kanagawa (JP)

(72) Inventors: Kenji Ohara, Kanagawa (JP); Norihisa Waki, Kanagawa (JP); Yoshiaki Nitta, Kanagawa (JP); Masanori Aoyagi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/740,366

(22) PCT Filed: Jul. 9, 2015

(86) PCT No.: PCT/JP2015/069771
§ 371 (c)(1),
(2) Date: Dec. 28, 2017

(87) PCT Pub. No.: WO2017/006480
PCT Pub. Date: Jan. 12, 2017

(65) Prior Publication Data
US 2018/0191027 A1    Jul. 5, 2018

(51) Int. Cl.
| | |
|---|---|
| *H01M 10/0567* | (2010.01) |
| *H01M 10/0562* | (2010.01) |
| *H01M 2/02* | (2006.01) |
| *H01M 2/16* | (2006.01) |
| *H01M 2/18* | (2006.01) |
| *H01M 10/0525* | (2010.01) |
| *H01M 10/0568* | (2010.01) |
| *H01M 4/02* | (2006.01) |

(52) U.S. Cl.
CPC ....... *H01M 10/0562* (2013.01); *H01M 2/024* (2013.01); *H01M 2/1613* (2013.01); *H01M 2/18* (2013.01); *H01M 10/0525* (2013.01); *H01M 10/0567* (2013.01); *H01M 10/0568* (2013.01); *H01M 2004/027* (2013.01); *H01M 2004/028* (2013.01); *H01M 2300/0025* (2013.01); *Y02T 10/7011* (2013.01)

(58) Field of Classification Search
CPC ......... H01M 10/0567; H01M 10/0562; H01M 10/0568; H01M 10/0525; H01M 2/024; H01M 2/1613; H01M 2/18; H01M 2004/027; H01M 2004/028; H01M 2300/0025; Y02E 60/122; Y02T 10/7011
See application file for complete search history.

(56) References Cited

U.S. PATENT DOCUMENTS

| | | |
|---|---|---|
| 2012/0301760 A1 | 11/2012 | Murai |
| 2013/0143129 A1 | 6/2013 | Okamoto et al. |
| 2014/0087248 A1 | 3/2014 | Tachibana et al. |
| 2014/0322576 A1 | 10/2014 | Okumura et al. |
| 2014/0370346 A1 | 12/2014 | Okumura et al. |

FOREIGN PATENT DOCUMENTS

| | | |
|---|---|---|
| CN | 101826636 A | 9/2010 |
| CN | 103069636 A | 4/2013 |
| CN | 103636048 A | 3/2014 |
| JP | 2001-325988 A | 11/2001 |
| JP | 2006-324194 A | 11/2006 |
| JP | 2011-105588 A | 6/2011 |
| JP | 2015-69810 A | 4/2015 |
| WO | 2010/097678 A1 | 9/2010 |
| WO | 2013/005502 A1 | 1/2013 |
| WO | 2013/128679 A1 | 9/2013 |

OTHER PUBLICATIONS

Xia et al., "One Sulfonate and Three Sulfate Electrolyte Additives Studied in Graphite/LiCoO2 Pouch Cells", Journal of the Electrochemical Society, 2015, pp. A2227-A2235, vol. 162, No. 12, USA.

*Primary Examiner* — Laura Weiner
(74) *Attorney, Agent, or Firm* — Global IP Counselors, LLP

(57) ABSTRACT

A nonaqueous electrolyte secondary battery includes a positive electrode, a negative electrode having a negative electrode active material, and a separator containing an electrolyte. The electrolyte includes an electrolyte salt, a nonaqueous solvent into which the electrolyte salt can be dissolved, a first additive selected from predetermined oxalate compounds and disulfonic acid ester compounds, and a second additive that has a reduction potential less than the reduction potential of the first additive. The second additive is selected from a group having vinylene carbonate, fluoroethylene carbonate, vinyl ethylene carbonate, 1, 3-propane sultone, 1, 4-butane sultone, 1, 3-propene sultone, succinonitrile, and adiponitrile.

11 Claims, 2 Drawing Sheets

NONAQUEOUS ELECTROLYTE SECONDARY BATTERY

CROSS-REFERENCE TO RELATED APPLICATIONS

This application is a U.S. National stage application of International Application No. PCT/JP2015/069771, filed Jul. 9, 2015.

BACKGROUND

Field of the Invention

The present invention relates to a nonaqueous electrolyte secondary battery.

Background Information

Nonaqueous electrolyte secondary batteries, particularly lithium ion secondary batteries, have been widely used as power supplies for mobile devices due to the high energy density, high durability, charge/discharge efficiency, and the like thereof.

In recent years, due to increasing awareness of the need for environmental protection measures, the use of lithium ion secondary batteries as a power supply for large-scale systems, such as electrically driven vehicles and stationary energy storage systems, is expanding. Batteries that are used as power supplies for such systems are required to achieve an increase in the size of the battery, improvements in battery characteristics such as further increasing the energy density, and high production efficiency in order to realize economically such battery performances.

In a lithium ion secondary battery, if charging and discharging of the battery is repeated, the nonaqueous solvent in the electrolyte is decomposed by electrochemically reaction with the negative electrode active material, and the decomposed substance generated at this time is deposited on the surface of the negative electrode active material as an SEI (Solid Electrolyte Interface) film. As a result, there is the problem of increased electrode reaction resistance. In addition, there is the problem that since the SEI film that is deposited in this manner is usually a rigid inorganic film, the film is destroyed by the stress that is caused by expansion and contraction of the negative electrode active material during charging and discharging, which results in the reduction of the characteristics of the electrode.

Thus, a technique to add an additive to the electrolyte of a lithium ion secondary battery is known, whereby, by intentionally causing the additive to decompose on the surface of the electrode at the time of initial charging, the decomposed substance functions as a protective SEI film that suppresses further decomposition of electrolytes. It is known that an SEI film formed by such additives greatly affects cycle performance, storage performance, charge/discharge efficiency, and safety of the battery.

In Japanese Laid-Open Patent Application No. 2001-325988 (US Patent Application Publication No. 2002/034678 Specification), a beneficial SEI film is said to be formed by carrying out initial charging by means of a charging step, in which a plurality of types of nonaqueous solvents are used, including a charging step that takes place at a potential at which one nonaqueous solvent is reduced, and a charging step that takes place at a potential at which another nonaqueous solvent is reduced.

SUMMARY

Here, while there are many performance requirements for a nonaqueous electrolyte secondary battery, such as a lithium ion secondary battery, particularly important battery performances include durability (cycle durability, storage durability) and input/output characteristics (cell internal resistance). According to an evaluation performed by the present inventors, it was found that improving both of these battery characteristics at the same time is difficult with the prior art, including Japanese Laid-Open Patent Application No. 2001-325988 (US Patent Application Publication No. 2002/034678 Specification). In addition, it was also found that the composition of the electrolytic solution proposed in the prior art, including Japanese Laid-Open Patent Application No. 2001-325988 (US Patent Application Publication No. 2002/034678 Specification), may be appropriate or inappropriate depending on the specifications of the active materials, etc., that are used to configure the battery, and good performance is not always achieved.

Therefore, the object of the present invention is to provide a means in which durability (cycle durability, storage durability) and input/output characteristics (cell internal resistance) of a battery can be improved at the same time, while being hardly affected by specifications of the active material that is used to configure the battery, in a nonaqueous electrolyte secondary battery such as a lithium ion secondary battery.

The present inventors carried out intensive research. As a result, it was found that the above-described object can be realized by using a liquid electrolyte containing a plurality of additives selected from predetermined compounds, and also by controlling the addition amount of each of the plurality of additives and the BET specific surface area of the negative electrode active material to satisfy a predetermined relational expression, leading to the completion of the present invention.

That is, one embodiment of the present invention provides a nonaqueous electrolyte secondary battery having a power-generating element comprising a positive electrode made by a positive electrode active material layer containing a positive electrode active material being formed on a surface of a positive electrode current collector, a negative electrode made by a negative electrode active material layer containing a negative electrode active material being formed on a surface of a negative electrode current collector, and a separator containing an electrolyte. The nonaqueous electrolyte secondary battery is characterized in that the electrolyte contains an electrolyte salt, a nonaqueous solvent into which the electrolyte salt can be dissolved, a first additive, and a second additive that has a reduction potential less than the reduction potential of the first additive, and, if the BET specific area of the negative electrode active material is SSA ($m^2/g$), the ratio (liquid coefficient) of the electrolyte amount to the total void volume of the positive electrode, the negative electrode, and the separator is L, the ratio of the addition amount of the first additive to the total amount of the nonaqueous solvent and the electrolyte salt in the electrolyte is A (mass %), and the ratio of the addition amount of the second additive to the total amount of the nonaqueous solvent and the electrolyte salt in the electrolyte is B (mass %), $$0.21 \leq A \times L/SSA \leq 0.69 \text{ and } 0.51 \leq B \times L/SSA \leq 1.5$$

are satisfied.

BRIEF DESCRIPTION OF THE DRAWINGS

Referring now to the drawings, a nonaqueous electrolyte secondary battery is illustrated.

DETAILED DESCRIPTION OF THE EMBODIMENTS

Figure 1:
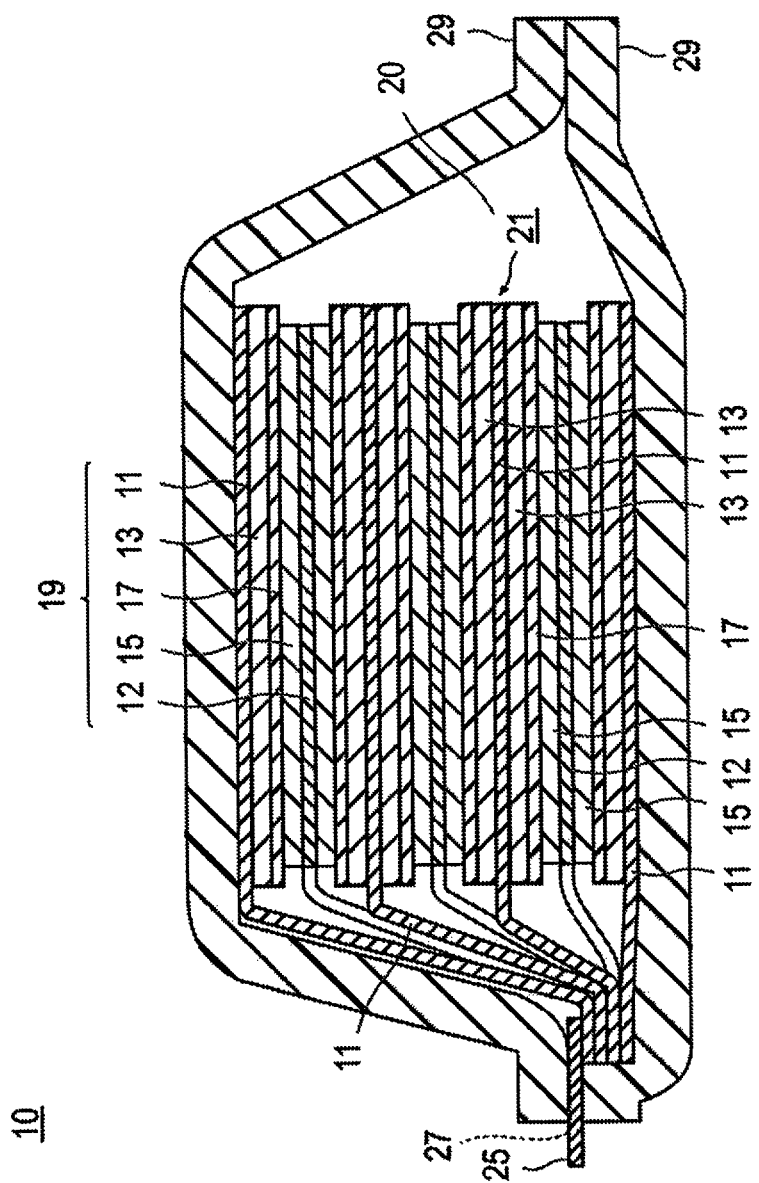
FIG. 1 is a schematic cross section showing an outline of a nonaqueous electrolyte secondary battery, which is one embodiment of the battery of the present invention, taken along line 1-1 shown in FIG. 2, described below.

One embodiment of the present invention provides a nonaqueous electrolyte secondary battery having a power-generating element comprising a positive electrode made by a positive electrode active material layer containing a positive electrode active material being formed on a surface of a positive electrode current collector, a negative electrode made by a negative electrode active material layer containing a negative electrode active material being formed on a surface of a negative electrode current collector, and a separator containing an electrolyte, wherein the electrolyte contains an electrolyte salt, a nonaqueous solvent into which the electrolyte salt can be dissolved, a first additive, and a second additive that has a reduction potential less than the reduction potential of the first additive; here, the first additive contains at least one type selected from a group comprising oxalate compounds represented by a predetermined chemical formula and disulfonic acid ester compounds represented by a predetermined chemical formula, and the second additive contains at least one type selected from a group comprising vinylene carbonate, fluoroethylene carbonate, vinyl ethylene carbonate, 1, 3-propane sultone, 1, 4-butane sultone, 1, 3-propene sultone, succinonitrile, and adiponitrile; and, if the BET specific area of the negative electrode active material is SSA [m²/g], the ratio (liquid coefficient) of the electrolyte amount to the total void volume of the positive electrode, the negative electrode, and the separator is L, the ratio of the addition amount of the first additive to the total amount of the nonaqueous solvent and the electrolyte salt in the electrolyte is A [mass %], and the ratio of the addition amount of the second additive to the total amount of the nonaqueous solvent and the electrolyte salt in the electrolyte is B [mass %], $$0.21 \leq A \times L/SSA \leq 0.69 \text{ and } 0.51 \leq B \times L/SSA \leq 1.5$$

are satisfied.

According to the present invention, by controlling the value of A×L/SSA described above to a value that is greater than or equal to the above-described predetermined lower limit value, it is possible to sufficiently and uniformly form an SEI film with the first additive, which can form a compact and dense SEI film, on the surface of the negative electrode active material. As a result, the storage durability of the battery can be improved. In addition, by controlling the value of B×L/SSA described above to a value that is greater than or equal to the above-described predetermined lower limit value, it is possible to stably form an SEI film with a laminated structure composed of the first additive and the second additive, on the surface of the negative electrode active material. As a result, the cycle durability of the battery can be improved. Furthermore, by controlling the values of A×L/SSA and B×L/SSA to values that are less than or equal to the above-described upper limit values, it is possible to suppress a rise in the internal resistance of the battery. As a result, the input/output characteristics can be improved.

Embodiments of the present invention will be explained below, with reference to the appended drawings. In the explanations of the drawings, the same elements have been assigned the same reference symbols, and redundant explanations are omitted. The dimensional ratios in the drawings are exaggerated for convenience of explanation, and are different from the actual ratios.

FIG. 1 is a schematic cross section showing an outline of a nonaqueous electrolyte secondary battery (hereinafter also simply referred to as "laminated battery"), which is one embodiment of the battery of the present invention, taken along line A-A shown in FIG. 2, described below. In the present Specification, a flat type (lamination type), non-bipolar lithium ion secondary battery illustrated in FIG. 1 will be used as an example for a detailed description, but the technical scope of the present invention is not limited to this mode.

First, the overall structure of the nonaqueous electrolyte secondary battery of the present invention will be described with reference to the drawings. The laminated battery 10 of the present embodiment comprises a structure in which a substantially rectangular power-generating element 21, in which a charge/discharge reaction actually progresses, is sealed inside a battery cladding material 29 which is an external casing, as illustrated in FIG. 1. Here, the power-generating element 21 has a configuration in which a positive electrode, a separator 17, and a negative electrode are layered. The separator 17 incorporates an electrolyte (in the present embodiment, a liquid electrolyte (electrolytic solution) containing an additive). The positive electrode comprises a structure in which positive electrode active material layers 15 are disposed on both sides of a positive electrode current collector 12. The negative electrode comprises a structure in which negative electrode active material layers 13 are disposed on both sides of a negative electrode current collector 11. Specifically, a negative electrode, an electrolyte layer, and a positive electrode are layered in this order such that one positive electrode active material layer 15 and an adjacent negative electrode active material layer 13 are opposite each other across a separator 17. As a result, the contiguous positive electrode, electrolyte layer, and negative electrode configure one single cell layer 19. Therefore, it can be said that the laminated battery 10 illustrated in FIG. 1 has a configuration in which a plurality of single cell layers 19 are laminated to be electrically connected in parallel.

While a negative electrode active material layer 13 is disposed on only one side of each of the outermost layer positive electrode current collectors located at the two outermost layers of the power-generating element 21, an active material layer may be provided on both sides as well. That is, instead of using a dedicated outermost layer current collector provided with an active material layer on only one side, a current collector having an active material layer on both sides may be used as the current collector on the outermost layer. In addition, by reversing the arrangement of the positive electrode and the negative electrode from FIG. 1, an outermost layer positive electrode current collector may be positioned at the two outermost layers of the power-generating element 21, and positive electrode active material layer may be disposed on one side of said outermost layer positive electrode current collector.

The positive electrode current collector 12 and the negative electrode current collector 11 comprise a structure in which a positive electrode collector plate (tab) 27 and a negative electrode collector plate (tab) 25 are electrically connected to each respective electrode (positive electrode and negative electrode) and led to the outside of the battery cladding material 29 and are sandwiched by the ends of the battery cladding material 29. The positive electrode collector plate 27 and the negative electrode collector plate 25 may be respectively attached to the positive electrode current collector 12 and the negative electrode current collector 11 of each electrode via a positive electrode lead and a negative electrode lead (not shown), if necessary, by ultrasonic welding or resistance welding.

While a flat type (laminated type) non-bipolar laminated battery is shown in FIG. 1, the battery may be a bipolar battery containing a bipolar electrode having a positive electrode active material layer that is electrically coupled to one surface of the current collector and a negative electrode active material layer that is electrically coupled to the opposite side surface of the current collector. In this case, one current collector serves as both a positive electrode current collector and a negative electrode current collector.

Each of the members configuring the non-aqueous electrolyte lithium ion secondary battery, which is one embodiment of the present invention, will be described below.

The positive electrode comprises a positive electrode current collector and a positive electrode active material layer formed on the surface of the positive electrode current collector.

While materials that constitute the positive electrode current collector are not particularly limited, metal is preferably used. Specific examples of metals include aluminum, nickel, iron, titanium, copper, stainless steel, and other alloys. In addition to the above, a cladding material of nickel and aluminum, a cladding material of copper and aluminum, or plating material of a combination of these metals may preferably be used. Additionally, the metal may be a foil obtained by coating aluminum on the surface thereof. Of the above, in regard to electron conductivity and battery operating potential, aluminum, stainless steel, and copper are favorable.

The size of the current collector is determined according to the intended use of the battery. For example, for a large battery that is required to have a high energy density, a current collector of large area is used. The thickness of the current collector is not particularly limited. The thickness of the current collector is usually about 1-100 μm.

The positive pole active material layer contains a positive pole active material. Specific configurations of the positive electrode active material are not particularly limited, and conventionally known materials can be used therefor. As one example, the positive electrode active material preferably contains a spinel-type lithium-manganese composite oxide and/or a lithium-nickel composite oxide. A preferred mode of these positive electrode active materials will be described below.

A spinel-type lithium-manganese composite oxide is typically a complex oxide essentially containing lithium and manganese having a composition of $LiMn_2O_4$ and having a spinel structure, and as to its specific constitution and production method, well-known knowledge can be appropriately referred to.

A spinel-type lithium-manganese composite oxide has a structure in which primary particles are agglomerated to form secondary particles. The average particle diameter of the secondary particles (average secondary particle diameter; D50) is preferably 5-50 μm, and more preferably 7-20 μm. The measurement of the average secondary particle diameter is carried out with the laser diffraction method.

As long as the lithium-nickel composite oxide is a composite oxide containing lithium and nickel, the composition thereof is not specifically limited. A typical example of a composite oxide containing lithium and nickel is the lithium-nickel composite oxide ($LiNiO_2$). However, a composite oxide in which part of the nickel atoms of the lithium-nickel composite oxide are substituted by other metal atoms is more preferable; in a preferred example, a lithium-nickel-manganese-cobalt composite oxide (hereinafter also simply referred to as "NMC composite oxide") has a layered crystal structure in which a lithium atom layer and a transition metal (in which Mn, Ni, and Co are orderly arranged) atom layer are alternately layered via an oxygen atom layer, and includes one Li atom per one atom of the transition metal M, such that the amount of Li that can be taken out is twice that of a spinel-type lithium-manganese composite oxide; that is, the supply capacity is doubled, providing a high capacity. In addition, since the thermal stability thereof is higher than that of $LiNiO_2$, it is particularly advantageous relative to nickel type composite oxides that are used as the positive electrode active material.

In the present Specification, NMC composite oxides include composite oxides in which a part of the transition metal element is substituted by another metal element. Examples of other elements in this case include Ti, Zr, Nb, W, P, Al, Mg, V, Ca, Sr, Cr, Fe, B, Ga, In, Si, Mo, Y, Sn, V, Cu, Ag, Zn, and the like, and are preferably Ti, Zr, Nb, W, P, Al, Mg, V, Ca, Sr, Cr, more preferably Ti, Zr, P, Al, Mg, Cr and are, in terms of improving the cycle characteristics, even more preferably Ti, Zr, Al, Mg, Cr.

In regard to the theoretically high discharge capacity, the NMC composite oxide preferably has a composition represented by the general formula (1): $Li_aNi_bMn_cCo_dM_xO_2$ (where a, b, c, d, x satisfy 0.9≤a≤1.2, 0<b<1, 0<c≤0.5, 0<d≤0.5, 0≤X≤0.3, and b+c+d=1. M is at least one element selected from Ti, Zr, Nb, W, P, Al, Mg, V, Ca, Sr and Cr). Here, a represents the atomic ratio of Li, b represents the atomic ratio of Ni, c represents the atomic ratio of Mn, d represents the atomic ratio of Co, and x represents the atomic ratio of M. In regard to the cycle characteristics, it is preferable in the general formula (1) that 0.4≤b≤0.6 is satisfied. The composition of each element can be measured by, for example, inductively coupled plasma (ICP) emission spectrometry.

In general, nickel (Ni), cobalt (Co), and manganese (Mn) are known to contribute to the capacity and the output characteristics, from the standpoint of improving the purity of the material and improving the electron conductivity. Ti and the like partially replace the transition metal in the crystal lattice. In regard to the cycle characteristics, it is preferable that a part of the transition element be substituted by another metal element, and in particular, it is preferable in the general formula (1) that 0<x≤0.3 be satisfied. Since the crystal structure is stabilized by at least one type selected from a group comprising Ti, Zr, Nb, W, P, Al, Mg, V, Ca, Sr, and Cr forming a solid solution, it is thereby possible to prevent a reduction in the battery capacity even if charging and discharging are repeated, and it is thought that excellent cycle characteristics can be realized.

The present inventors found that, in an NMC composite oxide, if, for example, the metal composition of nickel, manganese, and cobalt is nonuniform, such as in $LiNi_{0.5}Mn_{0.3}Co_{0.2}O_2$, the effect of distortion/cracking of the composite oxide at the time of charging and discharging described above is increased. This is thought to be because, since the metal composition is nonuniform, distortion occurs due to the stress applied to the inside of the particles during expansion and contraction, so that cracking is more likely to occur in the composite oxide. Therefore, for example, compared with a composite oxide in which the abundance ratio of Ni is high (for example, $LiNi_{0.8}Mn_{0.1}Co_{0.1}O_2$), or a composite oxide in which the abundance ratio of Ni, Mn, and Co is uniform (for example, $LiNi_{0.33}Mn_{0.33}Co_{0.33}O_2$), deterioration of the long-term cycle characteristics becomes conspicuous. On the other hand, by employing the configuration according to the present embodiment, it was found that, surprisingly, the cycle characteristics are improved even in a composite oxide in which the metal composition is nonuniform, such as $LiNi_{0.5}Mn_{0.3}Co_{0.2}O_2$.

Therefore, a positive electrode active material of a composite oxide, in which, in the general formula (1), b, c, and d satisfy $0.44 \leq b \leq 0.51$, $0.27 \leq c < 0.31$, and $0.19 \leq d \leq 0.26$, is preferable. By employing such a configuration, it is possible to provide a battery having an excellent balance between the capacity characteristics and the output characteristics.

A lithium-nickel composite oxide also has a structure in which primary particles are agglomerated to form secondary particles. The average particle diameter of the primary particles (average primary particle diameter; D50) is preferably less than or equal to 0.9 μm, more preferably 0.20-0.6 μm, and even more preferably 0.25-0.5 μm. Additionally, the average particle diameter of the secondary particles (average secondary particle diameter; D50) is preferably 5-20 μm, and more preferably 5-15 μm. Furthermore, the value of the ratio thereof (average secondary particle diameter/average primary particle diameter) is preferably greater than 11, more preferably 15-50, and even more preferably 25-40. While the primary particles constituting a lithium-nickel composite oxide usually has a hexagonal crystal structure having layered structure, the size of the crystallite diameter is correlated with the size of magnitude of the average primary particle diameter. Here, "crystallite" means the largest collection that can be regarded as a single crystal, which can be measured by a method in which the structural parameters of the crystal are refined from the diffraction intensity obtained by the powder X-ray diffraction measurement method, or the like. While the specific value of the crystallite diameter of the primary particles that constitute the lithium-nickel composite oxide is not particularly limited, from the standpoint of service life characteristics, the value is preferably less than or equal to 1 μm, more preferably less than or equal to 360 nm, and even more preferably less than or equal to 310 nm. By employing such a configuration, it becomes possible to reduce the displacement amount at the time of expansion and contraction of the active material, generation of miniaturization (cracking) of secondary particles accompanying repeated charging and discharging is suppressed, and it becomes possible to contribute to the improvement of the cycle characteristics. The lower limit value of the crystallite diameter is not particularly limited, but is usually greater than or equal to 20 nm. Here, in the present Specification, the value of the crystallite diameter in the positive electrode active material particles is measured by the Rietbert method, in which the crystallite diameter is calculated from the diffraction peak intensity obtained by powder X-ray diffraction measurement.

The tap density of the lithium-nickel composite oxide is preferably 2.3 g/cm³, and more preferably 2.4-2.9 g/cm³. By employing such a configuration, a high denseness of the primary particles that constitute the secondary particles of the positive electrode active material is sufficiently secured, and the improvement effect of the cycle characteristics can be maintained.

In addition, the BET specific area of the lithium-nickel composite oxide is preferably 0.1-1.0 m²/g, more preferably 0.3-1.0 m²/g, and particularly preferably 0.3-0.7 m²/g. With the specific surface area of the active material being in such a range, the reaction area of the active material is secured and the internal resistance of the battery is reduced, such that it becomes possible to minimize the occurrence of polarization at the time of the electrode reaction.

Furthermore, in regard to the lithium-nickel composite oxide, it is preferable that the diffraction peak intensity ratio ((003)/(004)) of the diffraction peak of the (104) plane and the diffraction peak of the (003) plane, obtained by powder X-ray diffraction measurement be preferably 1.28 or more, and more preferably 1.35-2.1. In addition, the diffraction peak integrated intensity ratio ((003)/(104)) is preferably 1.08 or more, and more preferably 1.10-1.45. These provisions are preferable for the following reasons. That is, a lithium-nickel composite oxide has a layered rock-salt type structure in which a $Li^+$ layer and an $Ni^{3+}$ layer are present between the oxygen layers. However, since $Ni^{3+}$ tends to be reduced to $Ni^{2+}$, and the ion radius of $Ni^{2+}$ (0.83 Å) is substantially equal to the ion radius of $Li^+$ (0.9 Å), $Ni^{2+}$ tends to be mixed in to the $Li^+$ deficit portions, which occur at the time of active material synthesis. When $Ni^{2+}$ is mixed into a $Li^+$ site, a structure that is electrochemically inactive is locally generated, and diffusion of $Li^+$ is inhibited. Consequently, if an active material with low crystallinity is used, there is the possibility that a decrease in the battery charge/discharge capacity and a reduction in durability will occur. The above-described provisions are used as an indicator of the height of this crystallinity. Here, the ratio of the intensity of the diffraction peaks of the (003) plane and the (104) plane, and ratio of the integrated intensity of the diffraction peaks, according to a crystal structure analysis using X-ray diffraction, are used as a method of quantifying crystallinity. When these parameters satisfy the above-described provisions, defects in the crystals are reduced, and it is possible to suppress a decrease in the battery charge/discharge capacity and a reduction in durability. Such parameters of crystallinity can be controlled by raw materials, compositions, firing conditions, and the like.

Lithium-nickel composite oxides such as the NMC composite oxide can be prepared by selecting various well-known methods, such as the coprecipitation method, spray drying method, and the like. Since preparation of the composite oxide according to the present embodiment is a simple matter, using the coprecipitation method is preferred. Specifically, as a method of synthesizing the NMC composite oxide, for example, as in the method disclosed in Japanese Laid-Open Patent Application No. 2011-105588, after a nickel-cobalt-manganese composite oxide is produced by the coprecipitation method, the nickel-cobalt-manganese composite oxide and a lithium compound is mixed and fired to obtain the NMC composite oxide.

In the case that the positive electrode active material contains a spinel-type lithium-manganese composite oxide and a lithium-nickel composite oxide, while the mixing ratio thereof is not particularly limited, from the standpoint of service life characteristics and cost, the content amount of the spinel-type lithium-manganese composite oxide is preferably 15-40 mass % and more preferably 30-40 mass %, relative to a content amount of 100 mass % of the lithium-nickel composite oxide.

In addition to the above-described positive electrode active material, the positive electrode active material layer may further contain other additives such as conductive assistants, binders, electrolytes (polymer matrix, ion-conduction polymers, electrolytic solutions), and lithium salts for enhancing ion conductivity, when needed. However, the content amount of materials that can function as an active material in the positive electrode active material layer and the negative electrode active material layer, described below, is preferably 85-99.5 mass %.

A conductive assistant is an additive that is blended in order to improve the conductivity of the positive electrode active material layer or the negative electrode active material layer. Examples of conductive assistants include carbon black such as Ketjen black, acetylene black, and carbon materials such as carbon fiber. If the active material layer contains a conductive assistant, an electron network is effectively formed inside the active material layer, which can contribute to an improvement in the output characteristics of the battery.

Although not particularly limited, examples of binders used for the positive electrode active material layer include the following materials. Examples include thermoplastic polymers such as polyethylene, polypropylene, polyethylene terephthalate (PET), polyether nitrile, polyacrylonitrile, polyimide, polyamide, cellulose, carboxymethyl cellulose (CMC) and salts thereof, ethylene-vinyl acetate copolymer, polyviynyl chloride, styrene-butadiene rubber (SBR), isoprene rubber, butadiene rubber, ethylene-propylene rubber, ethylene-propylene-diene copolymer, styrene-butadiene-styrene block copolymer and hydrogen additives thereof, styrene-isoprene-styrene block copolymer and hydrogen additives thereof; fluoride resins such as polyvinylidenefluoride (PVdF), polytetrafluoroethylene (PTFE), tetrafluoroethylene-hexafluoropropylene copolymer (FEP), tetrafluoroethylene-perfluoroalkyl vinylether copolymer (PFA), ethylene-tetrafluoroethylene copolymer (ETFE), polychlorotrifluoroethylene (PCTFE), ethylene-chlorotrifluoroethylene copolymer (ECTFE), polyvinyl fluoride (PVF); vinylidenefluoride fluororubbers such as vinylidenefluoride-hexafluoropropylene fluororubber (VDF-HFP fluororubber), vinylidenefluoride-hexafluoropropylene-tetrafluoroethylene fluororubber (VDF-HFP-TFE fluororubber), vinylidenefluoride-pentafluoropropylene fluororubber (VDF-PFP fluororubber), vinylidenefluoride-pentafluoropropylene-tetraflouroethylene fluororubber (VDF-PFP-TFE fluororubber), vinylidenefluoride-perfluoromethyl vinylether-tetrafluoroethylene fluororubber (VDF-PFMVE-TFE fluororubber), vinylidenefluoride-chlorotrifluoroethylene fluororubber (VDF-CTFE fluororubber); and epoxy resin, etc. These binders may be used individually, or two or more types may be used in combination.

Examples of the electrolyte salt (lithium salt) include inorganic acid anionic salts such as $LiPF_6$, $LiBF_4$, $LiClO_4$, $LiAsF_6$, $LiTaF_6$, $LiSbF_6$, $LiAlCl_4$, $Li_2B_{10}Cl_{10}$, $LiI$, $LiBr$, $LiCI$, $LiAICI$, $LiHF_2$, and $LiSCN$, and organic acid anionic salts such as $LiCF_3SO_3$, $Li(CF_3SO_2)_2N$, LiBOB (lithium bis oxalato borate), LiBETI (lithium bis (perfluoroelenesulfonyl imide); also written as $Li(C_2F_5SO_2)_2N$, and the like. These electrolyte salts may be used alone or in the form of a mixture of two or more.

Examples of the ion-conducting polymer include polyethylene oxide (PEO) system and polypropylene oxide (PPO) system polymers.

The compounding ratio of the components contained in the positive electrode active material layer and the negative electrode active material layer, described below, is not particularly limited. The compounding ratio can be adjusted by appropriately referring to common knowledge concerning lithium ion secondary batteries. The thickness of each active material layer is also not particularly limited, and common knowledge concerning batteries may be referenced. For example, the thickness of each active material layer is about 2-100 μm.

The positive electrode active material layer contains an active material, and may also contain other additives such as conductive assistants, binders, electrolytes (polymer matrix, ion-conduction polymers, electrolytic solutions), and lithium salts for enhancing ion conductivity, when needed. Other additives such as conductive assistants, binders, electrolytes (polymer matrix, ion-conduction polymers, electrolytic solutions), and lithium salts for enhancing ion conductivity are the same as those described in the positive electrode active material layer section above.

Examples of negative electrode active material include carbon material such as graphite, soft carbon, and hard carbon, lithium-transition metal composite oxide (for example, $Li_4Ti_5O_{12}$), metal materials, and lithium alloy based negative electrode materials. In some cases, two or more types of negative electrode active materials may be used in combination. Preferably, in regard to capacity and output characteristics, a carbon material or a lithium-transition metal composite oxide (of which a carbon material is preferable and graphite is particularly preferable) is used as the negative electrode active material. Needless to say, besides the foregoing, other negative electrode active materials may be used as well.

The average particle diameter of the negative electrode active material is not particularly limited, but, from the standpoint of high output, is preferably 1-100 μm, and more preferably 1-20 μm.

The BET specific area (SSA) of the negative electrode active material is preferably 0.5-10 $m^2/g$, more preferably 1.0-6.0 $m^2/g$, and even more preferably 2.0-4.2 $m^2/g$. If the specific surface area of the negative electrode active material is a value greater than or equal to the lower limit value, the risk of deterioration of the low temperature characteristics, accompanying an increase in the internal resistance, is reduced. On the other hand, if the value is less than or equal to the upper limit value, it becomes possible to prevent the progress of side reactions, accompanying an increase in the contact surface with the electrolyte. In particular, if the specific surface area is too large, there are cases in which gas that is generated at the time of the initial charge (when the film due to the electrolyte additive is not fixed) causes an overcurrent to locally flow on the electrode surface, generating a nonuniform coating film on the electrode surface and deteriorating the service life characteristics; however, if the value is less than or equal to that upper limit value described above, that risk is also reduced.

The negative electrode active material layer preferably contains at least an aqueous binder. An aqueous binder has a high binding force. Moreover, in addition to the fact that water as a raw material is readily available, since what is generated at the time of drying is water vapor, there is the benefit that capital expenditures for production can be dramatically suppressed, and it is possible to reduce the environmental burden.

An aqueous binder is a binder containing water as a solvent or a dispersion medium, and specific examples include thermoplastic resins, polymers having rubber elasticity, or a mixture thereof. Here, a binder containing water as a dispersion medium includes everything expressed as latex or an emulsion, and means a polymer that is emulsified with or suspended in water, examples of which include polymer latexes that are emulsion-polymerized in a system that self-emulsifies.

Specific examples of aqueous binders include styrene-based polymers (styrene-butadiene rubber, styrene-vinyl acetate copolymer, styrene-acrylic copolymer, etc.), acrylonitrile-butadiene rubber, methyl methacrylate butadiene rubber, (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyexyl acrylate, polyhexyl methacrylate, polyethylhexyl acrylate, polyethylhexyl methacrylate, polylauryl acrylate, polylauryl methacrylate, et.), polytetrafluoroethylene polyethylene, polypropylene, ethylene-propylene copolymer, polybutadiene, butyl rubber, fluororubber, polyethylene oxide, polyepichlorohydrin, polyphosphazene, polyacrylonitrile, polystyrene, ethylene-propylene-diene copolymer, polyvinyl pyridine, chlorosulfonated polyethylene, polyester resin, phenol resin, epoxy resin; and water-soluble polymers such as polyvinyl alcohol (average polymerization degree is preferably 200-4000, more preferably 1000-3000, saponification degree is preferably 80 mol % or more, more preferably 90 mol % or more) and modified products thereof (1-80 mol % saponified product of vinyl acetate unit of a copolymer with ethylene/vinyl acetate=2/98-30/70 molar ratio, 1-50 mol % partial acetalized product of polyvinyl alcohol, etc.), starch and modified products thereof (oxidized starch, phosphoric acid esterified starch, cationized starch, etc.), cellulose derivatives (carboxymethyl cellulose, methyl cellulose, hydroxypropyl cellulose, hydroxyethyl cellulose, and salts thereof, etc.), polyvinylpyrrolidone, polyacrylic acid (salt), polyethylene glycol, copolymers of (meth)acrylamide and/or (meth)acrylate [(meth)acrylamide polymer, (meth)acrylamide-(meth)acrylate copolymer, (meth)acrylic acid alkyl (carbon number 1-4) ester (meth)acrylic acid salt copolymer, etc.], styrene-maleic acid salt copolymer, Mannich modified polyacrylamide, formalin condensed resin (urea-formalin resin, Melamine-formalin resin, etc.), polyamide polyamine or dialkylamine-epichlorohydrin copolymer, polyethyleneimine, casein, soybean protein, synthetic protein, and mannan galactan derivatives. These aqueous binders may be used singly, or two or more types may be used in combination.

In regard to binding property, the aqueous binder preferably contains at least one rubber type binder selected from a group comprising styrene-butadiene rubber, acrylonitrile-butadiene rubber, methyl methacrylate-butadiene rubber, and methyl methacrylate rubber. Furthermore, since the binding property is favorable, the aqueous binder preferably contains styrene-butadiene rubber.

When using styrene-butadiene rubber as the aqueous binder, in terms of improving coatability, it is preferable that a water-soluble polymer described above be used in combination. Examples of favorable water-soluble polymers to be used in combination with the styrene-butadiene rubber include polyvinyl alcohol and modified products thereof, starch and modified products thereof, cellulose derivatives (carboxymethyl cellulose, methyl cellulose, hydroxyethyl cellulose, and salts thereof), polyvinylpyrrolidone, polyacrylic acid (salt), and polyethylene glycol. Of the above, it is preferable to combine styrene-butadiene rubber and carboxylmethyl cellulose (salt) as the binder. While the content mass ratio of the styrene-butadiene rubber and the water-soluble polymer is not particularly limited, styrene-butadiene rubber:water-soluble polymer is preferably 1:0.1-10 and more preferably 1:0.5-2.

Of the binders used in the negative electrode active material layer, the content amount of the aqueous binder is preferably 80-100 mass %, more preferably 90-100 mass %, and preferably 100 mass %.

The separator has the function of holding the electrolyte and ensuring lithium ion conductivity between the positive electrode and the negative electrode, and acts as a partition between the positive electrode and the negative electrode.

Examples of different forms of the separator include porous sheet separators made of polymers or fibers that absorb and hold the electrolyte and nonwoven fabric separators.

An example of a porous sheet separator made of polymers or fibers that can be used is microporous film. Examples of specific forms of porous sheets made of polymers or fibers include microporous (microporous film) separators made of polyolefins such as polyethylene (PE) and polypropylene (PP); laminated bodies obtained by layering a plurality thereof (for example, a laminated body with a three-layer structure of PP/PE/PP), polyimide, aramid, hydrocarbon resins such as polyvinylidene fluoride-hexafluoropropylene (PVdF-HFP), and glass fiber.

The thickness of the microporous (microporous film) separator differs depending on the intended use, and thus cannot be unambiguously defined. As one example, when used in a secondary battery for driving the motor in an electric vehicle (EV), a hybrid electric vehicle (HEV), or a fuel cell vehicle (FCV), the thickness of a single-layer or multi-layer separator is preferably 4-60 µm. The fine pore diameter of the microporous (microporous film) separator is preferably 1 µm or less at most (usually has a pore diameter of about several tens of nm).

As a nonwoven fabric separator, conventionally well-known ones such as cotton, rayon, acetate, nylon, polyester; polyolefins such as PP, PE; polymide and aramid, are used individually or as a mixture thereof. In addition, the bulk density of the nonwoven fabric is not particularly limited, as long as sufficient battery characteristics can be obtained by the polymer gel electrolyte used for impregnation. Furthermore, the thickness of the nonwoven fabric separator need only be the same as the electrolyte layer, preferably 5-200 µm and particularly preferably 10-100 µm.

Here, the separator is preferably a separator in which a heat-resistant insulating layer is laminated on a porous substrate (a separator with a heat-resistant insulating layer). The heat-resistant insulating layer is a ceramic layer containing inorganic particles and a binder. The separator with a heat-resistant insulating layer to be used should have high thermal resistance, in which the melting point or the heat softening point is 150° C. or higher, preferably 200° C. or higher. By having a heat-resistant insulating layer, the internal stress of the separator, which is increased when the temperature rises, is alleviated, so that a thermal contraction suppression effect can be obtained. As a result, since it is possible to prevent the occurrence of short-circuits between the electrodes of the battery, the battery configuration becomes one in which performance reduction due to temperature rise is less likely to occur. In addition, by having a heat-resistant insulating layer, the mechanical strength of the separator with a heat-resistant insulating layer is improved, and breakage of the separator is less likely to occur. Furthermore, due to the thermal contraction suppression effect and the high mechanical strength, the separator is less likely to curl during the production process of the battery.

The inorganic particles in the heat-resistant insulating layer contribute to the thermal contraction suppression effect and the mechanical strength of the heat-resistant insulating layer. The material used as the inorganic particles is not particularly limited. Examples include oxides ($SiO_2$, $Al_2O_3$, $ZrO_2$, $TiO_2$), hydroxides, and nitrides of silicon, aluminum, zirconium, and titanium, and composites thereof. These inorganic particles may be derived from mineral resources such as boehmite, zeolite, apatite, kaolin, mullite, spinel, olivine, mica, and the like, or be artificially produced. In addition, one type of these inorganic particles may be used alone, or two or more types thereof may be used in combination. Of the above, in regard to cost, using silica ($SiO_2$) or alumina ($Al_2O_3$) is preferable, and using alumina ($Al_2O_3$) is more preferable.

The total weight of the heat-resistant particles is not particularly limited, but is preferably 5-15 $g/m^2$. If the total weight is within this range, sufficient ion conductivity can be obtained and is preferable from the standpoint of maintaining the heat-resistance.

The binder in the heat-resistant insulating layer has the function of bonding the inorganic particle to each other, or bonding the inorganic particles and the resin porous substrate layer. A heat-resistant insulating layer is stably formed by the binder, and peeling between the porous substrate layer and the heat-resistant insulating layer is prevented.

The binder used in the heat-resistant insulating layer is not particularly limited, and examples of compounds that can be used as the binder include carboxymethyl cellulose (CMC), polyacrylonitrile, cellulose, ethylene-vinyl acetate copolymer, polyvinyl chloride, styrene-butadiene rubber (SBR), isoprene rubber, butadiene rubber, polyvinylidene fluoride (PVdF), polytetrafluoroethylene (PTFE), polyvinyl fluoride (PVF), and methyl acrylate. Of the foregoing, it is preferable to use carboxymethyl cellulose (CMC), methyl acrylate, or polyvinylidene fluoride (PVdF). These compounds may be used alone, or two or more types thereof may be used in combination.

The content amount of the binder in the heat-resistant insulating layer is preferably 2-20 mass %, relative to 100 mass % of the heat-resistant insulating layer. If the content amount of the binder is greater than or equal to 2 mass %, it is possible to increase the peeling resistance between the heat-resistant insulating layer and the porous substrate layer, and to improve the vibration resistance of the separator. On the other hand, if the content amount of the binder is less than or equal to 20 mass %, since the gaps between the inorganic particles are appropriately maintained, it is possible to secure sufficient lithium ion conductivity.

The thermal contraction rate of the separator with a heat-resistant insulating layer is preferably 10% or less in both MD and TD after being held for one hour, under the conditions of 150° C., 2 $gf/cm^2$. By using such a material with high thermal resistance, it is possible to effectively prevent shrinkage of the separator, even if a great amount of heat is generated by the positive electrode and the internal temperature of the battery reaches 150° C. As a result, since it is possible to prevent the occurrence of short-circuits between the electrodes of the battery, the battery configuration becomes one in which performance reduction due to temperature rise is less likely to occur.

As described above, the separator contains an electrolyte. In addition, in the nonaqueous electrolyte secondary battery according to the present embodiment, the electrolyte contains an electrolyte salt, a nonaqueous solvent into which the electrolyte salt can be dissolved, a first additive, and a second additive that has a reduction potential less than the reduction potential of the first additive. Here, the specific form of the electrolyte salt is as described above. The concentration of the electrolyte salt in the electrolyte is not particularly limited, but is preferably 0.5-2 mol/L with respect to the total amount of the electrolyte salt and the nonaqueous solvent.

Examples of the nonaqueous solvent include dimethyl carbonate (DMC), diethyl carbonate (DEC), dipropyl carbonate (DPC), ethyl methyl carbonate (EMC), methyl propionate (MP), methyl acetate (MA), methyl formate (MF), 4-methyldioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC), and γ-butyrolactone (GBL). Of the above, dimethyl carbonate (DMC), diethyl carbonate (DEC), dipropyl carbonate (DPC), ethyl methyl carbonate (EMC), ethylene carbonate (EC), propylene carbonate (PC), and butylene carbonate (BC) are preferable, and from the standpoint of being able to form a continuous film, it is preferable for the nonaqueous solvent to contain ethylene carbonate. The content amount of the ethylene carbonate in the case that the solvent contains ethylene carbonate is preferably 5-60% by volume, and more preferably 20-45% by volume, relative to 100% by volume of the nonaqueous solvent.

Additionally, the "additive" contained in the electrolyte means a substance having a oxidation-reduction decomposition potential, in which the content amount is less than 5 mass %, relative to 100 mass % of the total amount of the electrolyte salt, the nonaqueous solvent, and the additive. Thus, the additive can also be said to be a reductive decomposition type additive for forming SEI film. Therefore, even if the solvent dissolves electrolyte salt, a substance having an oxidation-reduction decomposition potential and a content amount of less than 5 mass % is included in the concept of an "additive." While the lower limit of the content amount of each additive is 0 mass %, in consideration of the addition effect, it is preferably 0.1 mass % or more, and more preferably 0.5 mass % or more.

The additive preferably has, as the reduction decomposition potential, a potential above 0.2 V (vs Li/Li+), at which intercalation of lithium ions with respect to the negative electrode active material (particles) is started. When the potential becomes less than or equal to 0.2 V with respect to lithium metal, and the lithium ions begin to be intercalated into the negative electrode active material (particles), such as graphite, the reactivity of the negative electrode also increases rapidly. In addition, when lithium ions that are solvated with the solvent molecules in the electrolytic solution are intercalated into the negative electrode active material (particles), such as graphite, the lithium ions are desolvated. At this time, if the quality of the SEI film is poor, the desolvation reaction is not smoothly carried out, which may lead to a deterioration of the battery characteristics, or cause deterioration such as peeling of the surface layer of the negative electrode active material (particles), such as graphite. This is why it is preferable for the additive to have, as at least the reduction decomposition potential, a potential above 0.2 V, at which intercalation of lithium ions with respect to the negative electrode active material (particles) is started.

In the present embodiment, a plurality (two or more types) of additives are used, and the upper limit of the types of additives to be used is not particularly limited. In consideration of the effect of the SEI film, it is preferably four types or less, and more preferably three types or less. Here, the additives to be added to the electrolyte in the present embodiment can be classified into the following four types. Of these, the first additive and the second additive are essential components, while the third additive and the fourth additive are optional components.

First additive: an additive selected from oxalate compounds represented by formula (1) and disulfonic acid ester compounds represented by formula (2), which are described below;

Second additive: an additive that has a reduction potential less than the reduction potential of the first additive and is selected from a group comprising vinylene carbonate, fluoroethylene carbonate, vinyl ethylene carbonate, 1,3-propane sultone, 1,4-butane sultone, 1,3-propene sultone, succinonitrile, and adiponitrile;

Third additive: an additive having a reduction potential that is less than the reduction potential of the above-described first additive and greater than the reduction potential of the above-described second additive;

Other additives: an additive other than the first to the third additives described above.

The first additive is at least one type selected from a group comprising oxylate compounds represented by the following formula (1):

Formula 1

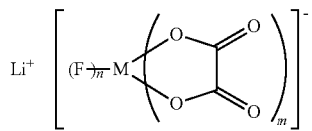

(1)

and disulfonic acid ester compounds represented by the following formula (2):

Formula 2

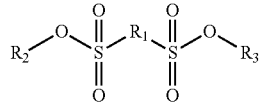

(2)

In the present Specification, the oxalate compounds described above shall not be included in the concept of the above-described "electrolyte salt."

Here, in formula (1), M represents phosphorus or boron, n represents an integer between 0-4, m represents an integer between 1-3, $2m+n=6$ if M is phosphorus, and $2m+n=4$ if M is boron. In addition, in formula (2), $R_1$ represents a substituted or unsubstituted 1-3C alkylene group, or a substituted or unsubstituted 1-3C fluoroalkylene group, $R_2$ and $R_3$ each independently represents a substituted or unsubstituted 1-4C alkylene group, or a substituted or unsubstituted 1-4C fluoroalkylene group, $R_2$ and $R_3$ may by bonded to each other to form a ring, and, if forming a ring, $R_3$ may be single-bonded. Examples of the alkylene groups in $R_1$ include a methylene group, an ethylene group, and a propylene group, of which a methylene group is preferable. An example of the flouoroalkylene group in $R_1$ is a group in which one or more hydrogen atoms of the alkylene group is substituted by a fluorine atom, specific examples of which are —CHF—, $CH_2CF_2$—, —$CF_2CH_2CF_2$—, —CH $(CF_3)$ $CF_2$—, and —$CH_2CF$ $(CF_3)$—, and the like.

Examples of optional substituents in $R_1$ include 1-3C alkyl groups (methyl group, ethyl group, n-propyl group, isopropyl group), 1-3C fluorine-substituted alkyl groups, vinyl groups, and fluorine atoms.

Examples of 1-4C alkyl group in $R_2$ and $R_3$ include methyl group, ethyl group, n-propyl group, isopropyl group, n-butyl group, isobutyl group, sec-butyl group, and tert-butyl group. An example of the flouoroalkylene group in $R_2$ and $R_3$ is a group in which one or more hydrogen atoms of the alkyl group is substituted by a fluorine atom, a specific example of which is 2,2-difluoro-n-propyl group.

Examples of optional substituents in $R_2$ and $R_3$ include vinyl groups and carbonyl groups.

The above-described first additive usually has the highest reduction potential of the additives that are added, which is able to form a compact and dense SEI film on the surface of the negative electrode active material, and can contribute to an improvement in the storage durability of the battery.

From this standpoint, preferable examples of the oxalate compounds represented by formula (1) above include lithium tetrafluorooxalate phosphate (following compound (1)), lithium difluorooxalate borate (following compound (4)), lithium bis(oxalate)borate (following compound (3)), and lithium difluorobis(oxalate)phosphate (following compound (2)). That is, the oxalate compound is preferably at least one type selected from the group comprising lithium tetrafluorooxalate phosphate, lithium difluorooxalate borate, lithium bis(oxalate)borate, and lithium difluorobis(oxalate) phosphate.

TABLE 1

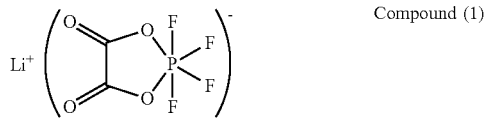

Compound (1)

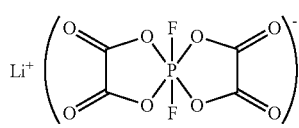

Compound (2)

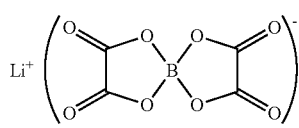

Compound (3)

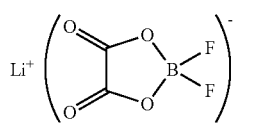

Compound (4)

In addition, compounds represented by formula (2) above include the following compounds (5)-(19).

TABLE 2

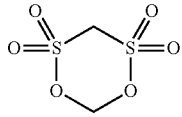

Compound (5)

TABLE 2-continued

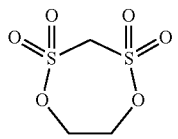 [SMILES: O=S1(=O)CS(=O)(=O)OCCO1]
Compound (6)

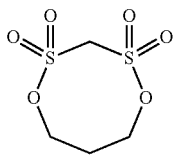 [SMILES: O=S1(=O)CS(=O)(=O)OCCCO1]
Compound (7)

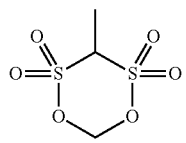
Compound (8)

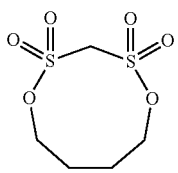
Compound (9)

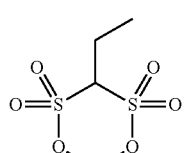
Compound (10)

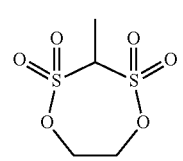
Compound (11)

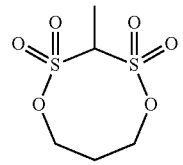
Compound (12)

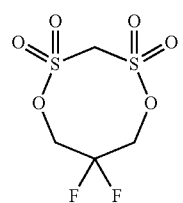 [SMILES: O=S1(=O)CS(=O)(=O)OCC(F)(F)CO1]
Compound (13)

TABLE 3

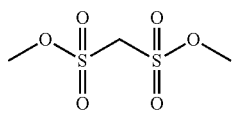
Compound (14)

TABLE 3-continued

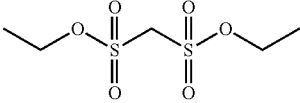
Compound (15)

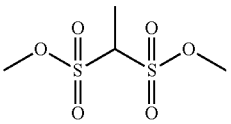
Compound (16)

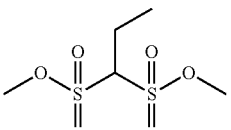
Compound (17)

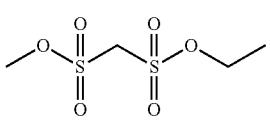
Compound (18)

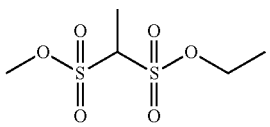
Compound (19)

Of the compounds represented by formula (2) above, in regard to film formation, methylene methane disulfonate (compound (5)), ethylene methane disulfonate (compound (6)), propylene methane disulfonate (compound (7)), dimethyl methane disulfonate (compound (14)), diethyl methane disulfonate (compound (15)), and ethyl methyl methane disulfonate (compound (18)) are preferable. That is, the disulfonic acid ester compound is preferably at least one type selected from a group comprising methylene methane disulfonate, ethylene methane disulfonate, propylene methane disulfonate, dimethyl methane disulfonate, diethyl methane disulfonate, and ethyl methyl methane disulfonate.

The oxalate compounds and the disulfonic acid ester compounds described above may be used singly, or a plurality thereof may be used in combination.

The concentration of the first additive in the electrolyte is not particularly limited, but is preferably 0.3-3.5 mass %, and more preferably 0.4-2 mass %, with respect to 100 mass % of the electrolyte. If the concentration of the first additive is 0.3 mass % or more, it is possible to sufficiently form an SEI film on the surface of the negative electrode active material. In addition, if the concentration of the first additive is 3.5 mass % or less, an initial rise in the resistance due to the formation of the SEI film is suppressed, and it becomes possible to form a homogeneous SEI film on the electrode surface.

The second additive is an additive selected from a group comprising vinylene carbonate, fluoroethylene carbonate, vinyl ethylene carbonate, 1,3-propane sultone, 1,4-butane sultone, 1,3-propene sultone, succinonitrile, and adiponitrile. These may be used individually, or two types or more may be used in combination. By using this second additive in combination with the above-described first additive, it becomes possible to form a stable SEI film with a laminated structure on the surface of the negative electrode active material and also to obtain a highly durable battery. The second additive preferably has a reduction potential that is greater than that of the nonaqueous solvent that has the highest reduction potential. By having such a reduction potential, the second additive is reductively decomposed before the nonaqueous solvent is decomposed, and it becomes possible to form a dense and stable SEI film on the surface of the negative electrode active material. In addition, since an SEI film formed by the reductive decomposition of the second additive does not form a mixed film with the first additive, which is decomposed at the highest reduction potential, there is the benefit that it becomes easier for the primary function of each additive to be realized.

The concentration of the second additive in the electrolyte is not particularly limited, but, considering the risk of resistance increase and the addition effect, the concentration is preferably 0.1 mass % or more and less than 5 mass %, and more preferably 1-4 mass %, with respect to 100 mass % of the electrolyte.

The third additive is an additive having a reduction potential that is less than the reduction potential of the above-described first additive and greater than the reduction potential of the above-described second additive. Examples of such third additives include succinic anhydride, glutaric acid, and adipic acid. Of the above, in regard to improving the durability, in the case that a third additive is used, the third additive is preferably succinic anhydride.

In the case that a third additive is used, the concentration of said third additive in the electrolyte is not particularly limited, but, considering the risk of resistance increase and the addition effect, the concentration is preferably 0.1-1.0 mass %, and more preferably 0.3-0.7 mass %, with respect to 100 mass % of the electrolyte.

The other additives are additives besides the first to the third additives described above. That is, a substance that does not satisfy the definitions of the first to the third additives described above and that has an oxidation-reduction decomposition potential in which the content amount is less than 5 mass %, relative to 100 mass % of the total amount of the electrolyte salt, the nonaqueous solvent, and the additive may be used as other additives. For example, compounds described above as nonaqueous solvents may be applicable as such other additives.

The electrolyte is not particularly limited as long as the electrolyte can exert the function of a carrier of lithium ions, and a liquid electrolyte or a gel polymer electrolyte is used. By using a gel polymer electrolyte, the distance between the electrodes is stabilized, generation of polarization is suppressed, and durability (cycle characteristics) is improved.

A liquid electrolyte has a form in which an electrolyte salt and an additive are dissolved in a nonaqueous solvent. A gel polymer electrolyte has a structure in which the liquid electrolyte described above is injected into a matrix polymer (host polymer) comprising an ion-conducting polymer. The fluidity of the electrolyte is eliminated by using a gel polymer electrolyte as the electrolyte, which is superior in terms of facilitating blocking of ion conductivity between each layer. Examples of ion-conducting polymers used as the matrix polymer (host polymer) include polyethylene oxide (PEO), polypropylene oxide (PPO), polyethylene glycol (PEG), polyacrylonitrile (PAN), polyvinylidene fluoride-co-hexafluoropropene (PVdF-HEP), poly(methyl methacrylate) (PMMA), and copolymers thereof.

The matrix polymer of a gel electrolyte can exhibit excellent mechanical strength by forming a cross-linked structure. In order to form a cross-linking structure, a polymerization treatment, such as thermal polymerization, ultraviolet polymerization, radiation polymerization, and electron beam polymerization may be carried out with respect to a polymerizable polymer for forming polyelectrolytes (e.g., PEO and PPO), using an appropriate polymerization initiator.

In the present Specification, the ratio of the electrolyte amount relative to the total void volume of the positive electrode, the negative electrode, and the separator is referred to as "liquid coefficient L." For example, if this liquid coefficient L is 1, the total void volume of the cell and the electrolyte amount are equal, and all of the electrolyte is exactly held in the voids in the positive electrode, the negative electrode, and the separator. The lower limit value of L is not particularly limited, but in order to improve the utilization efficiency of the active material, it is preferable that the voids in the cells be filled with the electrolyte to the extent possible. In this regard, preferably $L \geq 0.5$, more preferably $L \geq 0.8$, even more preferably $L \geq 0.9$, and particularly preferably $L \geq 1$. In addition, if L exceeds 1, an amount of electrolyte that exceeds the void volume in the cell is present; in this case, the excess electrolyte that is not retained in the voids that are present within the power-generating element (positive electrode, negative electrode, separator) will be present in the external space of the power-generating element. Therefore, since the amount of excess electrolyte is increased as L is increased, it is possible to prevent a lack of electrolyte caused by repeated charging and discharging and to improve the service life characteristics. In this regard, more preferably $L \geq 1.2$, and even more preferably $L \geq 1.4$.

On the other hand, an increase in L, that is, an increase in excess electrolyte amount leads to a reduction in the energy density of the cell. Therefore, from the standpoint of suppressing a reduction in the energy density, preferably $L \leq 2$, and more preferably $L \leq 1.8$.

The nonaqueous electrolyte secondary battery according to the present embodiment is characterized in that, if the BET specific area of the above-described negative electrode active material is SSA ($m^2/g$), the ratio of the addition amount of the first additive to the total amount of the nonaqueous solvent and the electrolyte salt in the electrolyte is A [mass %], and the ratio of the addition amount of the second additive to the total amount of the nonaqueous solvent and the electrolyte salt in the electrolyte is B [mass %], using the ratio (liquid coefficient L) of the electrolyte amount to the total void volume of the positive electrode, the negative electrode, and the separator, $$0.21 \leq A \times L/SSA \leq 0.69 \text{ and } 0.51 \leq B \times L/SSA \leq 1.5$$

are satisfied. These two relational expressions are mathematical expressions based on the knowledge attained by the present inventors that there exists an appropriate range of addition amounts of the first additive and the second additive per unit specific surface area of the negative electrode active material.

According to the nonaqueous electrolyte secondary battery of the present invention having such a configuration, by controlling the value of $A \times L/SSA$ described above to a value that is greater than or equal to the above-described predetermined lower limit value, it is possible to sufficiently and uniformly form an SEI film by the first additive, which can form a compact and dense SEI film on the surface of the negative electrode active material. As a result, the storage durability of the battery can be improved. In addition, by controlling the value of $B \times L/SSA$ described above to a value that is greater than or equal to the above-described predetermined lower limit value, it is possible to stably form an SEI film with a laminated structure composed of the first additive and the second additive on the surface of the negative electrode active material. As a result, the cycle durability of the battery can be improved. Furthermore, by controlling the values of A×L/SSA and B×L/SSA to values that are less than or equal to the above-described upper limit values, it is possible to suppress a rise in the internal resistance of the battery. As a result, the input/output characteristics can be improved.

Additionally, the relationship between A and B described above preferably further satisfies $2.50 \leq B/A \leq 4.33$ in regard to film formation.

Furthermore, in the case that a third additive (an additive having a reduction potential that is less than the reduction potential of the first additive and greater than the reduction potential of the second additive), which is an optional component described above, is contained, in regard to improving durability, when the ratio of the addition amount of the third additive in the electrolyte relative to the total amount of the nonaqueous solvent and the electrolyte salt is C [mass %], it is preferable that $0.17 \leq (A+C) \times L/SSA \leq 0.38$ also be satisfied.

Additionally, the relationship between A, B, and C described above preferably also satisfies $2.13 \leq B/(A+C) \leq 3.75$ in regard to film formation.

The material that configures the current collector plates (25, 27) is not particularly limited, and well-known highly conductive materials, which are conventionally used as current collector plates in a lithium ion secondary battery, may be used. Preferable examples of constituent materials of the current collector plate include metal materials such as aluminum, copper, titanium, nickel, stainless steel (SUS), and alloys thereof. In regard to low weight, corrosion resistance, and high conductivity, aluminum and copper are preferable, and aluminum is particularly preferable. The same material may be used for the positive electrode collector plate 25 and the negative electrode collector plate 27, or different materials may be used therefor.

Additionally, while not shown, the current collector 11 and the current collector plates (25, 27) may be electrically connected via a positive electrode lead and a negative electrode lead. Well-known materials that are used in lithium ion secondary batteries may be similarly employed as constituent materials of the positive electrode and negative electrode leads. The portion that is taken out from the cladding is preferably covered by a heat-shrinkable tube with heat-insulating properties so as to not affect the product (e.g., automobile parts, especially electronic equipment, etc.) by coming in contact with a peripheral device or wiring and causing electrical leakage.

For the battery outer package 29, a well-known metal can case may be used, or a bag-shaped case using laminate film containing aluminum that can cover the power-generating element may be used. A laminate film with a three-layer structure obtained by layering, for example, PP, aluminum, and nylon, in that order, may be used for the laminate film, but there are no limitations thereto. Laminate film is preferable in terms of excellent high output and cooling performance, and being capable of being favorably used for batteries for large equipment such as EV and HEV. Aluminate laminate is more preferable for the outer package, with which it is possible easily to adjust the group pressure applied from the outside to the power-generating element and to easily adjust to the desired layer thickness of the electrolytic solution.

Figure 2:
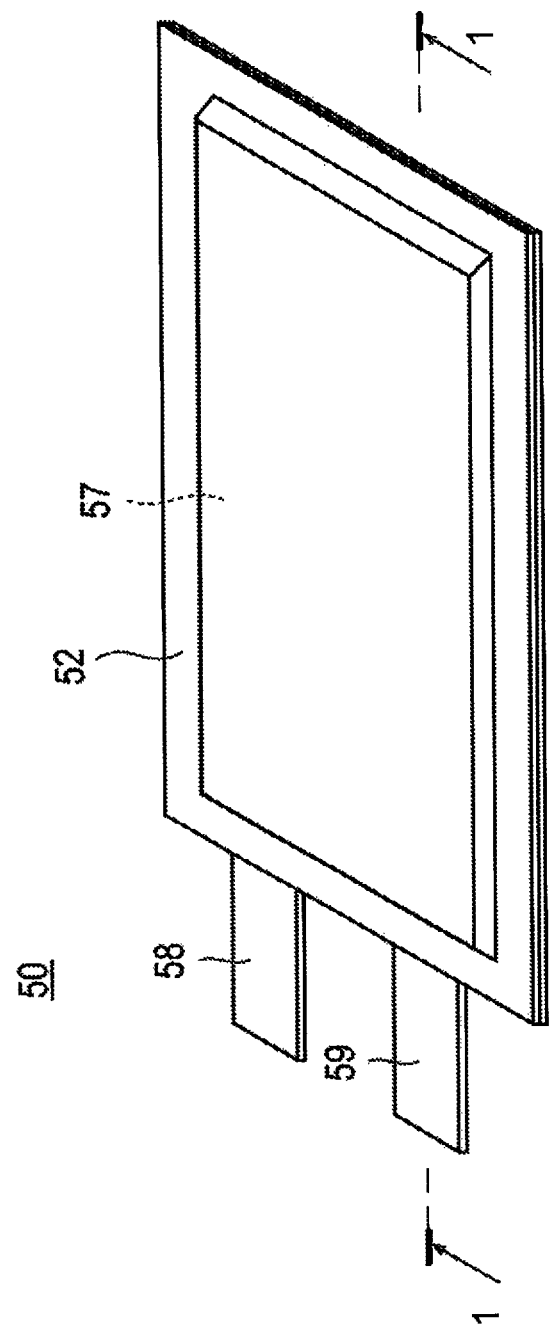
FIG. 2 is a perspective view showing the appearance of a flat nonaqueous electrolyte secondary battery, which is a representative embodiment of the battery of the present invention.

FIG. 2 is a perspective view showing the appearance of a flat nonaqueous electrolyte secondary battery, which is a representative embodiment of the battery of the present invention. According to a preferred embodiment of the present invention, such as this nonaqueous electrolyte secondary battery, a flat lamination type laminated battery having a configuration in which the power-generating element described above is enclosed in a battery outer package made of laminate film containing aluminum is provided.

The flat lithium ion secondary battery 50 has a flat rectangular shape, and a positive electrode tab 58 and a negative electrode tab 59 for taking out electric power are pulled out from the two sides thereof, as illustrated in FIG. 2. The power-generating element 57 is surrounded by a battery cladding material 52 of the lithium ion secondary battery 50, and the periphery thereof is thermally fused; the power-generating element 57 is sealed in a state in which the positive electrode tab 58 and the negative electrode tab 59 are pulled out to the outside. Here, the power-generating element 57 corresponds to the power-generating element 21 of the lithium ion secondary battery 10 illustrated in FIG. 1 described above. The power-generating element 57 is obtained by layering a plurality of single cell layers (unit cells) 19 configured from a positive electrode (positive electrode active material layer) 15, an electrolyte layer 17, and a negative electrode (negative electrode active material layer) 13.

The lithium ion secondary battery described above is not limited to a laminated type with a flat shape. In a wound-type lithium ion secondary battery, the shape may be cylindrical, or a rectangular flat shape made by deforming such a cylindrical shape; there is no particular limitation thereto. In the case of a cylindrical shape described above, a laminate film or a conventional cylindrical can (metal can) may be used for the exterior cladding, and there is no particular limitation thereto. Preferably, the power-generating element is sheathed by an aluminum laminate film. According to this form, weight reduction can be achieved.

The method of taking out the tabs 58, 59 illustrated in FIG. 2 is also not particularly limited. The method is not limited to the form illustrated FIG. 2; for example, the positive electrode tab 58 and the negative electrode tab 59 may be drawn from the same side, or, the positive electrode tab 58 and the negative electrode tab 59 may each be divided into a plurality of portions and drawn from each side. Additionally, in a wound type lithium ion battery, a terminal may be formed by utilizing, for example, a cylindrical can (metal can), instead of a tab.

In a typical electric automobile, the battery housing space is about 170 liters. Since a cell and auxiliary machines such as a charging and discharging controller are housed in this space, the housing space efficiency of the cell is usually about 50%. The loading efficiency of the cell in this space becomes a factor that governs the cruising distance of the electric automobile. If the size of the unit cell is small, the loading efficiency described above is impaired and a satisfactory cruising distance cannot be secured.

Therefore, in the present invention, it is preferable that the battery structure, in which the power-generating element is covered by an external casing, be large. Specifically, the length of the short side of the laminate cell battery is preferably 100 mm or more. Such a large battery can be used for application to a vehicle. Here, the length of the short side of a laminate cell battery refers to the side with the shortest length. While not particularly limited, the upper limit of the length of the short side is usually 400 mm or less.

In a common electric automobile, the market requirement for the travel distance on one charge (cruising distance) is 100 km. Considering such a cruising distance, the volume energy density of the battery is preferably greater than or equal to 157 Wh/L, and the rated capacity is preferably 20 Wh or more.

Here, from the standpoint of a large-sized battery, unlike from the standpoint of the physical size of the electrode, in the nonaqueous electrolyte secondary battery using the positive electrode of the present invention, the large size of the battery is defined by the relationship between the cell area and the battery capacity. Specifically, the nonaqueous electrolyte secondary battery according to the present embodiment is a flat lamination type laminated battery, the value of the ratio of the cell area relative to the rated capacity (the projected area of the battery including the battery outer casing) is greater than or equal to 5 $cm^2/Ah$, and the rated capacity is greater than or equal to 3 Ah. If such a large-area and large-capacity battery is employed, the problem of compatibility between the durability (storage durability and cycle durability) of the battery and the input/output characteristics (internal resistance) becomes even more apparent. On the other hand, the occurrence of such problems is less likely in a battery that does not have a large area and a large capacity, as in the case of a conventional consumer-type battery.

Furthermore, the aspect ratio of the rectangular electrode is preferably 1-3, and more preferably 1-2. The aspect ratio of the electrode is defined as the aspect ratio of the rectangular positive electrode active material layer. By setting the aspect ratio within such a range, there is the benefit that the required performance of the vehicle and mounting space can be made compatible.

It is preferable to hold at the decomposition potential of each additive such that the desired film formation is carried out. For example, the current is charged at 0.1 C and held for 1 hour at the desired voltage.

A battery pack is configured by connecting a plurality of batteries. Preferably, at least two or more batteries are used, which are connected in series, in parallel, or both. By connecting in series or parallel, it becomes possible to freely adjust the capacity and the voltage.

It is also possible to form a compact battery pack that can be attached and detached by connecting a plurality of batteries in series or in parallel. Then, it is also possible to form a battery pack having a large capacity and large output, suitable for a vehicle driving power supply or an auxiliary power supply, which are required to have high volume energy density and high volume output density, by further connecting a plurality of these compact battery packs, which can be attached and detached, in series or in parallel. How many batteries should be connected to produce a battery pack, and how many levels of compact battery packs should be stacked in order to produce a large-capacity battery pack may be determined according to the output and the battery capacity of the vehicle (electric automobile) to which the battery back is to be mounted.

In the nonaqueous electrolyte secondary battery of the present invention, the discharge capacity is maintained even after prolonged use, and the cycle characteristics are good. Furthermore, the volume energy density is high. In a vehicle application, such as in an electric automobile, a hybrid electric vehicle, a fuel cell vehicle, and a hybrid fuel cell vehicle, high capacity and increased size are required and extending the service life becomes necessary, compared with electric/portable electronic equipment applications. Therefore, the nonaqueous electrolyte secondary battery described above can be suitably used as a power source for a vehicle, such as a vehicle driving power supply or an auxiliary power supply.

Specifically, a battery, or a battery pack made by combining a plurality of these batteries can be mounted on a vehicle. In the present invention, since a battery with a long service life, having excellent long-term reliability and output characteristics can be configured by mounting such batteries, it is possible to configure a plug-in hybrid electric vehicle having a long EV travel distance, and an electric automobile having a long single-charge driving range. This is because, if the battery, or a battery pack made by combining a plurality thereof, is used, for example in an automobile, such as a hybrid vehicle, a fuel cell vehicle, or an electric automobile (in each case including four-wheel vehicles (passenger cars, commercial vehicles such as trucks and buses, light vehicles, etc.), two-wheel vehicles (motorcycles), and three-wheel vehicles), the vehicle becomes highly reliable with a long service life. However, the application is not limited to automobiles; for example, application is possible as various power sources of other vehicles, for example, mobile bodies such as trains, and it can also be utilized as a placement power source, such as an uninterruptible power supply device.

EXAMPLES

The present invention is described in further detail based on examples and comparative examples, but the present invention is not at all limited to the following examples. Unless otherwise specified, the following experiments were carried out at 25° C.

Preparation of Laminate Battery

Reference Example 1

(1) Preparation of the Positive Electrode 95 mass % of NMC complex oxide ($LiNi_{0.5}Mn_{0.3}CO_{0.2}O_2$), average secondary particle diameter (D50)=10 μm), which is the positive electrode active material, 2 mass % of conductive carbon black (super-P) as a conductive assistant, 3 mass % of polyvinylidene fluoride (PVdF) as a binder, and an appropriate amount of N-methyl-2-pyrrolidone (NMP) as a slurry viscosity adjusting solvent were mixed to prepare a positive electrode active material slurry.

The obtained positive electrode active material slurry was applied to both sides of an aluminum foil as a positive electrode current collector (thickness: 20 μm) and dried for three minutes at 120° C., and then compression-molded by a roll press machine to prepare a positive electrode having a single-sided coating amount of the positive electrode active material layer (excluding the current collector) of 18 $mg/cm^2$, and a density of the positive electrode active material layer of 3.1 $g/cm^3$.

(3) Preparation of the Negative Electrode

Natural graphite (having an amorphous coating layer on the surface, average particle diameter (D50)=18 μm, BET specific area (SSA)=1.6 $m^2/g$) was used as the negative electrode active material, and 96 mass % of this negative electrode active material, 1 mass % of conductive carbon black (super-P) as a conductive assistant, 1 mass % of carboxylmethyl cellulose (CMC) as a binder, and 2 mass % of styrene-butadiene copolymer (SBR) were dispersed in purified water, to prepare a negative electrode active material slurry. The negative electrode active material used here is also referred to as "active material (1)."

The obtained negative electrode active material slurry was applied to both sides of a copper foil as a negative electrode current collector (thickness: 10 μm) and dried for three minutes at 120° C., and then compression-molded with a roll press machine to prepare a negative electrode having a single-sided coating amount of the negative electrode active material layer (excluding the current collector) of 9.5 mg/cm² and a density of the negative electrode active material layer of 1.5 g/cm³.

(4) Preparation of Laminate Battery

The positive electrode (cut to 200 mm square) and the negative electrode (cut to 202 mm square) obtained above were alternately laminated (three layers of the positive electrodes and four layers of the negative electrodes) respectively via a separator (Celgard #2500, polypropylene microporous film, size of 204 mm square) to prepare a laminate. Tabs (current collector plates) were welded to the positive and negative electrodes of this laminate, which were sandwiched between aluminum laminate film, and three sides were sealed. Thereafter, a predetermined amount of nonaqueous electrolyte solution was injected, and the remaining side was vacuum-sealed, to prepare a laminate battery. The nonaqueous electrolyte solution that was used was obtained by adding vinylene carbonate (VC, corresponding to the second additive) as an additive at a concentration of 1 mass % (mass percentage based on the total mass of the electrolyte salt and the mixed solvent) to a solution in which 1.0M $LiPF_6$ was dissolved in a mixed solvent of ethylene carbonate (EC) and diethyl carbonate (DEC) (volume ratio 3:7, 3EC 7DEC). The injection amount of the nonaqueous electrolyte solution was set to an amount in which the ratio of the nonaqueous electrolyte solution amount (liquid coefficient L) relative to the total void volume of the positive electrode, the negative electrode, and the separator was 1.5.

The rated capacity (Ah) of the obtained laminate battery of Reference Example 1, and the ratio of the cell area relative to the rated capacity were 4.5 Ah and 70 cm²/Ah, respectively.

Comparative Examples 1-7 and Examples 1-9

Other than changing the type and concentration (mass percentage with respect to the total mass of the electrolyte salt and the mixed solvent) of the additive that was added to the nonaqueous electrolyte solution as shown in Table 4 below, laminate batteries of Comparative Examples 1-7 and Examples 1-9 were prepared by the same method as the Reference Example 1 described above.

The rated capacity (Ah) of the obtained laminate batteries of Comparative Examples 1-7 and Examples 1-9, and the ratio of the cell area relative to the rated capacity were, in all cases, 4.5 Ah and 70 cm²/Ah, respectively.

Reference Example 2

Other than using natural graphite (having an amorphous coating layer on the surface, average particle diameter (D50)=10 BET specific area (SSA)=3.5 m²/g) as the negative electrode active material, a laminate battery of Reference Example 2 was prepared using the same method as the Reference Example 1 described above. The negative electrode active material used here is also referred to as "active material (2)."

Comparative Examples 8-15 and Examples 10-38

Other than changing the type and amount of the additive that was added to the nonaqueous electrolyte solution as shown in Table 5 below, laminate batteries of Comparative Examples 8-15 and Examples 10-38 were prepared using the same method as the Reference Example 2 described above.

The rated capacity (Ah) of the obtained laminate batteries of Comparative Examples 8-15 and Examples 10-38 and the ratio of the cell area relative to the rated capacity were, in all cases, 4.5 Ah and 70 cm²/Ah, respectively.

Measurement of the Reduction Potential

When the reduction potential of the additives used in the present Examples was measured using the following method, methylene methane disulfonate (MMDS) was 1.5 V, vinylene carbonate (VC) was 1.15 V, fluoroethylene carbonate (FEC) was 1.0 V, succinic anhydride (Suc) was 1.3 V, ethylene carbonate (EC) was 0.9 V, and diethyl carbonate (DEC) was 0.3 V.

The reduction potential can be obtained from a cyclic voltammogram obtained by a cyclic voltammetry measurement. Specifically, first, $LiPF_6$ is dissolved as an electrolyte salt such that the concentration becomes 1.0M to a nonaqueous solvent obtained by mixing ethylene carbonate (EC) and diethyl carbonate (DEC) at a ratio of EC/DEC=1/1 (volume ratio) to prepare an electrolytic solution. Next, 1 mass % of additive is added to 100 mass % of this electrolytic solution to prepare an electrolytic solution containing the additive (nonaqueous solvent). Next, this electrolytic solution is added to a triode cell in which the graphite negative electrode is the working electrode, and lithium metal is the counter electrode and the reference electrode, which is used as an electrochemical cell. The current value of when the potential of the working electrode is changed from the open-circuit potential to a lower potential at a scanning speed of 0.1 mV/sec is measured. Using the measured value when using an electrolytic solution that does not contain an additive is a blank, the potential of the highest peak from among the reduction decomposition peaks that are characteristically observed when adding the additive is defined as the reduction potential of the additive.

Evaluation of the Laminate Battery

The following evaluations were carried out regarding the laminate batteries prepared above. The results are shown in Table 4 and Table 5 below. The results shown in Table 4 and Table 5 are relative values, when the value of Reference Example 1 is set to 100 for Comparative Examples 1-7 and Examples 1-9, and relative values when the value of Reference Example 2 is set to 100 for Comparative Examples 8-15 and Examples 10-38. Additionally, Table 4 and Table 5 also show the values of A×L/SSA, B×L/SSA, (A+C)×L/SSA, B/A, and B/(A+C).

First, constant current charging was carried out until the cell voltage reached 4.15V at a rate of 0.1 C with respect to the design capacity. Next, constant current discharge was carried out at a rate of 1 C for 20 seconds from 50% SOC, and the internal resistance of the battery was measured from the voltage drop value at this time. The smaller the internal resistance value, the better the input/output characteristics.

In a 50° C. environment, over a cell voltage range of 4.15-2.5 V, 1,000 cycles of a charge/discharge cycle test was carried out at a rate of IC. Then, the retention rate of the discharge capacity at the 1,000th cycle with respect to the initial discharge capacity (first cycle) was calculated. The larger this value, the better the cycle durability.

In a 50° C. environment, at a cell voltage of 4.15 V, the battery was allowed to stand for two months. Thereafter, over a cell voltage range of 4.15-2.5 V, a discharge test was carried out at a rate of 1 C to measure the discharge capacity. Then, the retention rate of the discharge capacity after storage with respect to the discharge capacity of the first cycle, measured in "Measurement of capacity retention rate (cycle durability)" above, was calculated. The larger this value, the better the storage durability.

TABLE 4

| | NEGATIVE ELECTRODE ACTIVE MATERIAL | SSA | L | MMDS | VC | FEC | Suc | A/SSA | B/SSA | (A + C)/SSA |
|---|---|---|---|---|---|---|---|---|---|---|
| REFERENCE EXAMPLE 1 | ACTIVE MATERIAL (1) | 1.6 | 1.5 | 0.0 | 1.0 | 0.0 | 0.0 | — | 0.94 | — |
| COMPARATIVE EXAMPLE 1 | ACTIVE MATERIAL (1) | 1.6 | 1.5 | 0.1 | 1.3 | 0.0 | 0.0 | 0.09 | 1.22 | |
| COMPARATIVE EXAMPLE 2 | ACTIVE MATERIAL (1) | 1.6 | 1.5 | 0.2 | 1.3 | 0.0 | 0.0 | 0.19 | 1.22 | |
| EXAMPLE 1 | ACTIVE MATERIAL (1) | 1.6 | 1.5 | 0.3 | 1.3 | 0.0 | 0.0 | 0.28 | 1.22 | |
| EXAMPLE 2 | ACTIVE MATERIAL (1) | 1.6 | 1.5 | 0.4 | 1.3 | 0.0 | 0.0 | 0.38 | 1.22 | |
| EXAMPLE 3 | ACTIVE MATERIAL (1) | 1.6 | 1.5 | 0.5 | 1.3 | 0.0 | 0.0 | 0.47 | 1.22 | |
| EXAMPLE 4 | ACTIVE MATERIAL (1) | 1.6 | 1.5 | 0.6 | 1.3 | 0.0 | 0.0 | 0.56 | 1.22 | |
| COMPARATIVE EXAMPLE 3 | ACTIVE MATERIAL (1) | 1.6 | 1.5 | 0.4 | 0.5 | 0.0 | 0.0 | 0.38 | 0.47 | |
| EXAMPLE 5 | ACTIVE MATERIAL (1) | 1.6 | 1.5 | 0.4 | 0.5 | 0.4 | 0.0 | 0.38 | 0.84 | |
| EXAMPLE 6 | ACTIVE MATERIAL (1) | 1.6 | 1.5 | 0.4 | 0.6 | 0.8 | 0.0 | 0.38 | 1.50 | |
| EXAMPLE 7 | ACTIVE MATERIAL (1) | 1.6 | 1.5 | 0.4 | 1.0 | 0.5 | 0.0 | 0.38 | 1.41 | |
| COMPARATIVE EXAMPLE 4 | ACTIVE MATERIAL (1) | 1.6 | 1.5 | 0.4 | 2.0 | 0.5 | 0.0 | 0.38 | 2.34 | |
| COMPARATIVE EXAMPLE 5 | ACTIVE MATERIAL (1) | 1.6 | 1.5 | 0.4 | 2.5 | 0.5 | 0.0 | 0.38 | 2.81 | |
| COMPARATIVE EXAMPLE 6 | ACTIVE MATERIAL (1) | 1.6 | 1.5 | 0.4 | 3.0 | 0.5 | 0.0 | 0.38 | 3.28 | |
| COMPARATIVE EXAMPLE 7 | ACTIVE MATERIAL (1) | 1.6 | 1.5 | 0.4 | 3.5 | 0.5 | 0.0 | 0.38 | 3.75 | |
| EXAMPLE 8 | ACTIVE MATERIAL (1) | 1.6 | 1.5 | 0.4 | 1.5 | 0.0 | 0.2 | 0.38 | 1.41 | 0.56 |
| EXAMPLE 9 | ACTIVE MATERIAL (1) | 1.6 | 1.5 | 0.4 | 1.5 | 0.0 | 0.3 | 0.38 | 1.41 | 0.66 |

| | B/A | B/(A + C) | EVALUATION (1) | EVALUATION (2) | EVALUATION (3) |
|---|---|---|---|---|---|
| REFERENCE EXAMPLE 1 | — | — | 100.0 | 100.0 | 100.0 |
| COMPARATIVE EXAMPLE 1 | 13.00 | | 100.5 | 105.0 | 100.0 |
| COMPARATIVE EXAMPLE 2 | 6.50 | | 100.5 | 101.0 | 105.0 |
| EXAMPLE 1 | 4.33 | | 100.0 | 105.0 | 120.0 |
| EXAMPLE 2 | 3.25 | | 100.5 | 105.0 | 125.0 |
| EXAMPLE 3 | 2.60 | | 100.5 | 106.0 | 127.0 |
| EXAMPLE 4 | 2.17 | | 103.0 | 106.0 | 128.5 |
| COMPARATIVE EXAMPLE 3 | 1.25 | | 99.5 | 94.0 | 119.0 |
| EXAMPLE 5 | 2.25 | | 100.0 | 98.0 | 122.0 |
| EXAMPLE 6 | 4.00 | | 102.0 | 110.0 | 120.0 |
| EXAMPLE 7 | 3.75 | | 102.5 | 110.0 | 121.5 |
| COMPARATIVE EXAMPLE 4 | 6.25 | | 105.0 | 110.0 | 105.0 |
| COMPARATIVE EXAMPLE 5 | 7.50 | | 113.0 | 108.0 | 103.0 |
| COMPARATIVE EXAMPLE 6 | 8.75 | | 116.0 | 106.0 | 98.5 |
| COMPARATIVE EXAMPLE 7 | 10.00 | | 120.0 | 99.0 | 96.0 |
| EXAMPLE 8 | 3.75 | 2.50 | 102.0 | 113.0 | 121.0 |
| EXAMPLE 9 | 3.75 | 2.14 | 102.5 | 115.0 | 119.0 |

TABLE 5

| | NEGATIVE ELECTRODE ACTIVE MATERIAL | SSA | L | MMDS | VC | FEC | Suc | A/SSA | B/SSA | (A+C)/SSA | B/A | B/(A+C) | EVALUATION (1) | EVALUATION (2) | EVALUATION (3) |
|---|---|---|---|---|---|---|---|---|---|---|---|---|---|---|---|
| REFERENCE EXAMPLE 2 | ACTIVE MATERIAL (2) | 3.5 | 1.5 | 0.0 | 1.0 | 0.0 | 0.0 | — | 0.43 | — | — | — | 100.0 | 100.0 | 100.0 |
| COMPARATIVE EXAMPLE 8 | ACTIVE MATERIAL (2) | 3.5 | 1.5 | 0.3 | 1.8 | 0.7 | 0.0 | 0.13 | 1.07 | | 8.33 | | 100.5 | 110.0 | 100.0 |
| COMPARATIVE EXAMPLE 9 | ACTIVE MATERIAL (2) | 3.5 | 1.5 | 0.4 | 1.8 | 0.7 | 0.0 | 0.17 | 1.07 | | 6.25 | | 100.5 | 111.0 | 102.0 |
| EXAMPLE 10 | ACTIVE MATERIAL (2) | 3.5 | 1.5 | 0.5 | 1.8 | 0.7 | 0.0 | 0.21 | 1.07 | | 5.00 | | 100.5 | 120.0 | 106.0 |
| EXAMPLE 11 | ACTIVE MATERIAL (2) | 3.5 | 1.5 | 0.6 | 1.8 | 0.7 | 0.0 | 0.26 | 1.07 | | 4.17 | | 101.0 | 109.0 | 115.0 |
| EXAMPLE 12 | ACTIVE MATERIAL (2) | 3.5 | 1.5 | 0.7 | 1.8 | 0.7 | 0.0 | 0.30 | 1.07 | | 3.57 | | 101.0 | 113.0 | 117.0 |
| EXAMPLE 13 | ACTIVE MATERIAL (2) | 3.5 | 1.5 | 0.8 | 1.8 | 0.7 | 0.0 | 0.34 | 1.07 | | 3.13 | | 101.0 | 114.0 | 119.0 |
| EXAMPLE 14 | ACTIVE MATERIAL (2) | 3.5 | 1.5 | 0.9 | 1.8 | 0.7 | 0.0 | 0.39 | 1.07 | | 2.78 | | 101.5 | 115.0 | 118.0 |
| EXAMPLE 15 | ACTIVE MATERIAL (2) | 3.5 | 1.5 | 1.0 | 1.8 | 0.7 | 0.0 | 0.43 | 1.07 | | 2.50 | | 102.0 | 113.0 | 116.0 |
| EXAMPLE 16 | ACTIVE MATERIAL (2) | 3.5 | 1.5 | 1.1 | 1.8 | 0.7 | 0.0 | 0.47 | 1.07 | | 2.27 | | 102.5 | 103.0 | 109.5 |
| EXAMPLE 17 | ACTIVE MATERIAL (2) | 3.5 | 1.5 | 1.2 | 1.8 | 0.7 | 0.0 | 0.51 | 1.07 | | 2.08 | | 102.5 | 102.5 | 108.0 |
| EXAMPLE 18 | ACTIVE MATERIAL (2) | 3.5 | 1.5 | 1.3 | 1.8 | 0.7 | 0.0 | 0.56 | 1.07 | | 1.92 | | 103.0 | 103.0 | 107.0 |
| EXAMPLE 19 | ACTIVE MATERIAL (2) | 3.5 | 1.5 | 1.4 | 1.8 | 0.7 | 0.0 | 0.60 | 1.07 | | 1.79 | | 103.0 | 104.0 | 106.5 |
| EXAMPLE 20 | ACTIVE MATERIAL (2) | 3.5 | 1.5 | 1.5 | 1.8 | 0.7 | 0.0 | 0.64 | 1.07 | | 1.67 | | 103.0 | 103.0 | 105.0 |
| EXAMPLE 21 | ACTIVE MATERIAL (2) | 3.5 | 1.5 | 1.6 | 1.8 | 0.7 | 0.0 | 0.69 | 1.07 | | 1.56 | | 103.0 | 101.0 | 105.0 |
| COMPARATIVE EXAMPLE 10 | ACTIVE MATERIAL (2) | 3.5 | 1.5 | 2.0 | 1.8 | 0.7 | 0.0 | 0.86 | 1.07 | | 1.25 | | 104.5 | 101.0 | 104.0 |
| COMPARATIVE EXAMPLE 11 | ACTIVE MATERIAL (2) | 3.5 | 1.5 | 0.6 | 0.5 | 0.0 | 0.0 | 0.26 | 0.21 | | 0.83 | | 99.0 | 85.0 | 105.0 |
| COMPARATIVE EXAMPLE 12 | ACTIVE MATERIAL (2) | 3.5 | 1.5 | 0.6 | 0.7 | 0.5 | 0.0 | 0.26 | 0.43 | | 1.67 | | 99.5 | 99.0 | 107.0 |
| EXAMPLE 22 | ACTIVE MATERIAL (2) | 3.5 | 1.5 | 0.6 | 1.0 | 0.5 | 0.0 | 0.26 | 0.51 | | 2.00 | | 101.0 | 105.0 | 107.0 |
| EXAMPLE 23 | ACTIVE MATERIAL (2) | 3.5 | 1.5 | 0.6 | 1.3 | 0.5 | 0.0 | 0.26 | 0.64 | | 2.50 | | 101.0 | 109.0 | 106.0 |
| EXAMPLE 24 | ACTIVE MATERIAL (2) | 3.5 | 1.5 | 0.6 | 2.0 | 1.0 | 0.0 | 0.26 | 0.86 | | 3.33 | | 101.0 | 114.0 | 117.5 |
| EXAMPLE 25 | ACTIVE MATERIAL (2) | 3.5 | 1.5 | 0.6 | 2.5 | 1.0 | 0.0 | 0.26 | 0.99 | | 3.83 | | 101.5 | 117.0 | 120.5 |
| EXAMPLE 26 | ACTIVE MATERIAL (2) | 3.5 | 1.5 | 0.6 | 3.0 | 1.0 | 0.0 | 0.26 | 1.29 | | 5.00 | | 102.5 | 115.0 | 119.0 |
| COMPARATIVE EXAMPLE 13 | ACTIVE MATERIAL (2) | 3.5 | 1.5 | 0.6 | 3.5 | 1.0 | 0.0 | 0.26 | 1.50 | | 5.83 | | 104.0 | 103.0 | 108.0 |
| COMPARATIVE EXAMPLE 14 | ACTIVE MATERIAL (2) | 3.5 | 1.5 | 0.6 | 1.8 | 1.0 | 0.0 | 0.26 | 1.71 | | 6.67 | | 106.0 | 97.0 | 107.0 |
| COMPARATIVE EXAMPLE 15 | ACTIVE MATERIAL (2) | 3.5 | 1.5 | 0.6 | 1.8 | 0.7 | 0.0 | 0.26 | 1.93 | | 7.50 | | 110.0 | 90.0 | 102.0 |
| EXAMPLE 27 | ACTIVE MATERIAL (2) | 3.5 | 1.5 | 0.5 | 1.8 | 0.7 | 0.1 | 0.21 | 1.07 | 0.26 | 5.00 | 4.17 | 101.0 | 110.0 | 110.0 |
| EXAMPLE 28 | ACTIVE MATERIAL (2) | 3.5 | 1.5 | 0.5 | 1.8 | 0.7 | 0.2 | 0.21 | 1.07 | 0.30 | 5.00 | 3.57 | 101.5 | 111.0 | 112.0 |
| EXAMPLE 29 | ACTIVE MATERIAL (2) | 3.5 | 1.5 | 0.5 | 1.8 | 0.7 | 0.3 | 0.21 | 1.07 | 0.34 | 5.00 | 3.13 | 102.0 | 112.0 | 118.5 |
| EXAMPLE 30 | ACTIVE MATERIAL (2) | 3.5 | 1.5 | 0.5 | 1.8 | 0.7 | 0.4 | 0.21 | 1.07 | 0.39 | 5.00 | 2.78 | 102.5 | 115.0 | 119.0 |
| EXAMPLE 31 | ACTIVE MATERIAL (2) | 3.5 | 1.5 | 0.5 | 1.8 | 0.7 | 0.5 | 0.21 | 1.07 | 0.43 | 5.00 | 2.50 | 102.5 | 112.0 | 120.0 |
| EXAMPLE 32 | ACTIVE MATERIAL (2) | 3.5 | 1.5 | 0.5 | 1.8 | 0.7 | 0.6 | 0.21 | 1.07 | 0.47 | 5.00 | 2.27 | 103.0 | 107.0 | 118.0 |
| EXAMPLE 33 | ACTIVE MATERIAL (2) | 3.5 | 1.5 | 0.5 | 1.0 | 0.3 | 0.2 | 0.21 | 0.56 | 0.30 | 2.60 | 1.86 | 102.0 | 105.0 | 107.0 |
| EXAMPLE 34 | ACTIVE MATERIAL (2) | 3.5 | 1.5 | 0.6 | 1.0 | 0.7 | 0.2 | 0.26 | 0.73 | 0.34 | 2.83 | 2.13 | 102.5 | 110.0 | 114.0 |
| EXAMPLE 35 | ACTIVE MATERIAL (2) | 3.5 | 1.5 | 0.6 | 1.5 | 0.7 | 0.2 | 0.26 | 0.94 | 0.34 | 3.67 | 2.75 | 102.5 | 111.0 | 116.0 |
| EXAMPLE 36 | ACTIVE MATERIAL (2) | 3.5 | 1.5 | 0.6 | 2.0 | 0.7 | 0.2 | 0.26 | 1.16 | 0.34 | 4.50 | 3.38 | 103.0 | 113.0 | 114.0 |
| EXAMPLE 37 | ACTIVE MATERIAL (2) | 3.5 | 1.5 | 0.6 | 2.0 | 1.0 | 0.2 | 0.26 | 1.29 | 0.34 | 5.00 | 3.75 | 103.0 | 115.0 | 113.0 |
| EXAMPLE 38 | ACTIVE MATERIAL (2) | 3.5 | 1.5 | 0.6 | 2.5 | 1.0 | 0.2 | 0.26 | 1.50 | 0.34 | 5.83 | 4.38 | 103.0 | 100.0 | 103.0 |

From the results above, in the laminate batteries of the Examples according to the present invention (nonaqueous electrolyte secondary battery), the durability (cycle durability, storage durability) and the input/output characteristics (cell internal resistance) of the battery could both be improved at the same time. In contrast, in the laminate batteries of the comparative example, at least one of the durability and the input/output characteristics of the battery was not improved, and thus these characteristics could not be improved at the same time. In addition, since similar results were obtained when using either active material (1) or active material (2) as the negative electrode active material, it was also confirmed that, according to the present invention, the characteristics described above can be improved at the same time, without hardly being affected by the specifications of the active material, etc., used to configure the battery.

Additionally, the laminate batteries obtained in the Examples and the comparative examples are large-sized, large-capacity, and large-area laminate batteries, as can be seen from the rated capacity and the ratio of the cell area relative to the rated capacity. Thus, the effects of the present invention are not limited to the capacity and the size of the battery, and it was confirmed that the present invention is useful for large-sized, large-capacity, and large-area electrical devices.

The invention claimed is:

1. A nonaqueous electrolyte secondary battery having a power-generating element comprising:
   a positive electrode made by a positive electrode active material layer including a positive electrode active material being formed on a surface of a positive electrode current collector,
   a negative electrode made by a negative electrode active material layer including a negative electrode active material being formed on a surface of a negative electrode current collector, and
   a separator containing an electrolyte,
   wherein:
   the electrolyte includes an electrolyte salt, a nonaqueous solvent into which the electrolyte salt can be dissolved, a first additive, and a second additive that has a reduction potential less than the reduction potential of the first additive,
   the first additive being at least one type selected from a group comprising oxylate compounds represented by the following formula

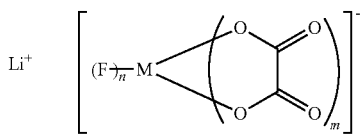

where M represents phosphorus or boron, n represents an integer between 0-4, m represents an integer between 1-3, 2m+n=6 if M is phosphorus, and 2m+n=4 if M is boron, and disulfonic acid ester compounds represented by the following formula

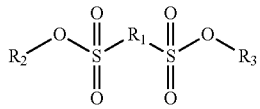

where $R_1$ represents a substituted or unsubstituted 1-3C alkylene group, or a substituted or unsubstituted 1-3C fluoroalkylene group, $R_2$ and $R_3$ each independently represents a substituted or unsubstituted 1-4C alkylene group, or a substituted or unsubstituted 1-4C fluoroalkylene group, $R_2$ and $R_3$ bonded to each other to form a ring, and $R_3$ being single-bonded when forming a ring:

the second additive being at least one type selected from a group comprising vinylene carbonate, fluoroethylene carbonate, vinyl ethylene carbonate, 1,3-propane sultone, 1,4-butane sultone, 1,3-propene sultone, succinonitrile, and adiponitrilea; and a relationship $0.21 \leq A \times L/SSA \leq 0.69$ and $0.51 \leq B \times L/SSA \leq 1.5$ is satisfied, where:

SSA represents a BET specific surface area of the negative electrode active material ($m^2/g$), L represents a ratio of a total volume of the electrolyte to a total void volume of the positive electrode, the negative electrode and the separator, A represents a mass ratio of an amount of the first additive to a total amount of the nonaqueous solvent and the electrolyte salt in the electrolyte, and B represents a mass ratio of an amount of the second additive to the total amount of the nonaqueous solvent and the electrolyte salt in the electrolyte.

2. The nonaqueous electrolyte secondary battery as recited in claim 1,
   wherein the first additive is the oxalate compound, wherein the oxalate compound is at least one type selected from a group comprising lithium tetrafluorooxalate phosphate, lithium difluorooxalate borate, lithium bis(oxalate)borate, and lithium difluorobis(oxalate)phosphate.

3. The nonaqueous electrolyte secondary battery as recited in claim 1,
   wherein the first additive is the disulfonic acid ester compound, wherein the disulfonic acid ester compound is at least one selected from a group comprising methylene methane disulfonate, ethylene methane disulfonate, propylene methane disulfonate, dimethyl methane disulfonate, diethyl methane disulfonate, and ethyl methyl methane disulfonate.

4. The nonaqueous electrolyte secondary battery as recited in claim 1, wherein $2.50 \leq B/A \leq 4.33$ is further satisfied.

5. The nonaqueous electrolyte secondary battery as recited in claim 1, wherein
   the negative electrode active material includes graphite.

6. The nonaqueous electrolyte secondary battery as recited in claim 1, wherein
   the nonaqueous solvent comprises ethylene carbonate.

7. The nonaqueous electrolyte secondary battery as recited in claim 1, wherein
   the electrolyte further includes a third additive having a reduction potential that is less than a reduction potential of the first additive and greater than a reduction potential of the second additive, and
   $0.17 \leq (A+C) \times L/SSA \leq 0.38$ is satisfied, where C represents a mass ratio of an addition amount of the third additive in the electrolyte relative to the total amount of the nonaqueous solvent and the electrolyte salt (mass %).

8. The nonaqueous electrolyte secondary battery as recited in claim 7, wherein the third additive is at least one selected from the group consisting of: succinic anhydride, glutaric acid, and adipic acid.

9. The nonaqueous electrolyte secondary battery as recited in claim 7, wherein $2.13 \leq B/(A+C) \leq 3.75$ is further satisfied.

10. The nonaqueous electrolyte secondary battery as recited claim 1, wherein
a value of a ratio of a cell area relative to a rated capacity that is a projected area of the battery nonaqueous electrolyte secondary including a battery outer casing is greater than or equal to 5 cm$^2$/Ah, and the rated capacity is greater than or equal to 3 Ah.

11. The nonaqueous electrolyte secondary battery as recited in claim 1, wherein
the nonaqueous electrolyte secondary battery is a lithium ion secondary battery.

\* \* \* \* \*